United States Patent [19]
Myles, III et al.

[11] Patent Number: 5,937,849
[45] Date of Patent: Aug. 17, 1999

[54] COVERED CANAL OR AQUEDUCT HAVING AN INTEGRAL SOLAR ENERGY CONCENTRATING SYSTEM

[76] Inventors: John F. Myles, III, Rte. 3, Box 200, Pittsboro, N.C. 27312; Michael H. Nicklas, 1237 Gatehouse Dr., Cary, N.C. 27511; Louis J. Gerics, 804 Sasser St., Raleigh, N.C. 27604

[21] Appl. No.: 08/673,084

[22] Filed: Jul. 1, 1996

Related U.S. Application Data

[63] Continuation-in-part of application No. 08/379,841, Jan. 26, 1995, Pat. No. 5,564,410.

[51] Int. Cl.$^6$ ........................................... F24T 2/42
[52] U.S. Cl. ........................ 126/562; 126/561; 126/621; 126/684
[58] Field of Search ...................... 126/621, 561, 126/562, 566, 684, 623, 672, 628, 696

[56] References Cited

U.S. PATENT DOCUMENTS

| | | | |
|---|---|---|---|
| 4,055,161 | 10/1977 | Jones | 126/640 X |
| 4,159,629 | 7/1979 | Korr et al. | 126/561 X |
| 4,315,500 | 2/1982 | Gonder | 126/561 X |
| 4,326,498 | 4/1982 | Eckland | 126/561 X |
| 4,461,276 | 7/1984 | Yogev et al. | 126/561 X |
| 4,475,535 | 10/1984 | Assaf | 126/640 X |
| 4,621,612 | 11/1986 | Nakamoto | 126/561 X |
| 5,540,217 | 7/1996 | Myles et al. | 126/621 X |
| 5,564,411 | 10/1996 | Myles, III et al. | 126/621 |

FOREIGN PATENT DOCUMENTS

| 820705 | 11/1937 | France | 126/561 |
|---|---|---|---|

*Primary Examiner*—Larry Jones
*Attorney, Agent, or Firm*—Brian D. Voyce

[57] ABSTRACT

The present invention relates to a covered canal or aqueduct having an integral solar energy concentrating system. Either photo-voltaic panels or a combination of solar energy concentrating reflectors and reflected solar energy collectors are used, among other solar energy concentrating or energy transferring elements, as part of a membrane means to gather radiant solar energy from atop the surface over a canal or aqueduct. Either the photo-voltaic panels or the reflector panels are integrated into other membrane means elements which are supported by a structural means so as to prevent evaporative loss from solar heating and wind movement of waters in the canal. Thus, the present invention results in the more efficient transfer of waters through canals while simultaneously collecting radiant solar energy.

104 Claims, 19 Drawing Sheets

COVERED CANAL OR AQUEDUCT HAVING AN INTEGRAL SOLAR ENERGY CONCENTRATING SYSTEM

This application is a continuation-in-part of Ser. No. 08/379,841, "A Roof Having an Integral Solar Energy Concentrating System", now U.S. Pat. No. 5,564,410, filed Jan. 26, 1995.

TECHNICAL FIELD

The present invention relates to a covered canal or aqueduct having an integral solar energy concentrating system. Either photo-voltaic panels or a combination of solar energy concentrating reflectors and reflected solar energy collectors are used, among other solar energy concentrating or energy transferring elements, as part of a membrane means to gather radiant solar energy from atop the surface over a canal or aqueduct. Either the photo-voltaic panels or the reflector panels are integrated into other membrane means elements which are supported by a structural means so as to prevent evaporative loss from solar heating and wind movement of waters in the canal. Thus, the present invention results in the more efficient transfer of waters through canals while simultaneously collecting radiant solar energy.

RELATED APPLICATIONS

A modular form for certain elements described herein is disclosed in modular form in Ser. No. 08/379,843, a U.S. non-provisional utility patent application entitled "A Roof Module Having an Integral Solar Energy Concentrator", which is incorporated by reference hereto.

The present invention also can incorporate the use of replaceable solar energy concentrating reflectors as described in Ser. No. 08/379,845, a U.S. non-provisional utility patent application entitled "An Improved Solar Energy Concentrating System Having Replaceable Reflectors", which is incorporated by reference hereto.

BACKGROUND ART

In the past, if solar energy concentrating systems were used on top of buildings or roofed structures to gather radiant solar energy, then one could select from two options. The first option was simply to take a solar energy concentrating system suitable for use on the ground and mount it up on top of a roofed structure. While such an approach did gather radiant solar energy, it also required that the roof support a substantially greater weight. This add-on approach resulted in substantially higher capital costs. Moreover, once the system was atop the roofed structure, inevitably the underlying roof would need repair. The presence of the system atop the roof in a non-integrated fashion increased the ease and cost of making roof repairs.

The second option was to make a substantial portion of the roof into a solar energy concentrating reflector. An example of this unitary reflector approach can be found in U.S. Pat. No. 3,994,435 to Barr. While Barr no longer had the disadvantage of added supporting structure as in the add-on approach, Barr had to make compromises in gathering the radiant solar energy. The semi-cylindrical reflector and fixed collector did not collect as much solar energy as ground-based units with better geometries. Also, Barr required that the underlying building have a shape similar to the reflector, and thus, the ends of the Barr building had to swoop arcuately upwards, mimicking the reflector arc. Such a requirement had obvious disadvantages in being used on the numerous flat roofed buildings and roofed structures which are used for commercial or industrial purposes.

DISCLOSURE OF THE INVENTION

The present invention relates to a covered canal or aqueduct having an integral solar energy concentrating system. Either photo-voltaic panels or a combination of solar energy concentrating reflectors and reflected solar energy collectors is used, among other solar energy concentrating or energy transferring elements, as part of a membrane means to gather radiant solar energy from atop the surface over a canal or aqueduct. Either the photo-voltaic panels or the reflectors/backing panels are integrated into other membrane means elements which are supported by a structural means so as to prevent evaporative loss from solar heating and wind movement of waters in the canal. Thus, the present invention results in the more efficient transfer of waters through canals while simultaneously collecting radiant solar energy. (For the purposes of the present invention, "canal" includes all structures designed to transport water exposed to the atmosphere, including aqueducts.) Typically, a canal has a bottom surface, a first side wall attached to the bottom surface and extending upwards, and a second side wall attached to the bottom surface opposite the first side wall and extending upwards. The first and second side walls are attached to the bottom surface and extending longitudinally so as to form the canal.

One of the ordinary skill in the art would appreciate that because the present invention is exposed to the weather, that the selection of materials in constructing the present invention must taken into account the effects weather has at the site of use.

The present canal cover system comprises a number of structural, membrane, and solar energy collecting elements. Starting with the structural elements, a structural support means extends above and across the upper surface of the water in the canal. The structural support means is supported by a first load-bearing member disposed about the first side wall of the canal and a second load-bearing member disposed about the opposing second side wall of the canal. (For the purposes of the present invention, a "load-bearing member" includes ground based supports, such as concrete or rammed earth footers or the side aprons of a canal.) Typically, the structural support means comprises a plurality of canal spanning members. (For the purposes of the present invention, a "canal spanning member" includes conventional load bearing structures for supporting roofs such as trusses or beams.) If desired, the structural support means can be elevated at working heights above the level of the canal waters and the load-bearing members. For example, each canal spanning member can be connected to a first upright load-bearing member extending upwards from the first load-bearing member and a second upright load-bearing building member extending upwards from the second load-bearing member. (For the purposes of the present invention, an "upright load-bearing member" includes conventional means of supporting canal spanning members, such as walls or columns.) Each canal spanning member is separated laterally from an adjacent canal spanning member by a distance at least sufficient to allow a backing panel or a solar energy concentrating reflector to be disposed within that distance. For practical commercial purposes, the minimum distance between adjacent canal spanning members is at least 8 feet, and the minimum length for the canal spanning members is at least 16 feet. However, depending upon the choice of cover spanning design and material, much greater distances can be spanned, as is known to those of ordinary skill in the art.

The structural means can vary depending upon the optimum orientation for the primary reflectors or photo-voltaic collector means. In many cases where the reflector facing is substantially perpendicular to the direction of the length of the canal, one can use canal spanning members that simply cross over the width of the canal. However in other cases where the reflector facing is substantially parallel to the direction of the length of the canal, one can use a combination of canal spanning members, such as a space truss that supports the membrane means, (and thus the reflectors), which runs substantially parallel to the direction of the length of the canal, combined with a flat truss that runs across the canal width and underlies and supports the parallel truss.

Each canal spanning member has a plurality of upper panel support points, a plurality of lower panel support points or a combination of upper panel support points and lower panel support points. (For the purposes of the present invention, an "underlying panel support means" includes either an upper panel support or a lower panel support.) These underlying panel support means are for attaching and supporting membrane means elements. In a first main variant of the present invention, a backing panel is supported. In a second main variant, a reflector is support directly. In either variants, non-reflective roofing panels may be substituted for either a reflector or a backing panel. The lower panel support points are spaced outward from and down from the upper support points. The plurality of canal spanning members are dimensioned and configured to support the weight of all of the supported elements in the following paragraphs, as well as conventional dead loads and live loads associated therewith which are known to those of ordinary skill in the art.

The present invention not only reduces the loss of transported canal waters by preventing exposure of the waters to the weather, it can provide additional waters to those being transported. Guttering means can be provided for the membrane means surface such that any ambient precipitation can be captured and directed into the canal.

Cover With Backing Panels

In the first variant of the present invention, a plurality of backing panels is used as part of the membrane means that prevents evaporative loss. At least one backing panel is disposed between adjacent canal spanning members. Each backing panel has a concave and cylindrically arcuate configuration of up to 180 degrees, a lower edge, an upper edge, and curved lateral edges. (For the purposes of the present invention, "lower" and "upper" with respect to the reflectors or the backing panels do not express, necessarily, a relative position between the edges. For example, if a reflector has a 180 degree configuration, then these edges may be equidistant in height with respect to its supporting surface.) The backing panels can be disposed laterally adjacent to one another between adjacent canal spanning members so as to form a row for up to the entire length of the canal spanning members. At least one of the curved lateral edges of at least one backing panel disposed in each row attaches either to the upper panel support points of the underlying canal spanning member, to the lower panel support points of the underling canal spanning member, or to a combination of such upper panel support points and lower panel support points. Each backing panel is disposed such that the skyward surface is the concave surface. Also, each backing panel is dimensioned and configured along the curved lateral edges where the curved lateral edge of a backing panel can be placed adjacent along the curved lateral edge of another backing panel for the length of the underlying canal spanning member so as to form the row of adjacent backing panels. One of ordinary skill in the art can use various materials to construct the above backing panel, including fabricated metals or alloys, and molded laminates or composites.

On top of each backing panel lies a reflector. Thus, the first variant of the present invention also comprises a plurality of solar energy concentrating reflectors. Because a backing panel is present, the reflector can be flexible and can rely upon an underlying backing panel to provide the correct configuration. If the reflector is not substantially flexible, then, the reflector has a concave and cylindrically arcuate configuration complementary to the underlying backing panel. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying backing panel, being attached thereto by conventional means, including mechanical fastening means or adhesive means.

As part of the membrane means that form a seal against evaporative loss of canal waters, the present invention includes a plurality of spanning member cap means. In the first variant, each spanning member cap means is connected either to the top of a canal spanning member, the upper edge of a reflector, or the upper edge of a backing panel. (For the purposes of the present invention, an "underlying cap support means" includes the top of the canal spanning member, the upper edge of either a reflector or a photo-voltaic panel, and the upper edge of a backing panel for either a reflector or a photo-voltaic panel.) Each spanning member cap means extends lengthwise for the length of the canal spanning member and extends laterally across the canal spanning member. Each spanning member cap means is dimensioned and configured so as to form a weathertight seal with either the backing panels or the reflectors, and the canal spanning member over which the spanning cap means is disposed.

Another membrane means element is the end cap means. The present invention includes a plurality of end cap means, each being situated or disposed at the outside or end of the canal spanning member, so as to seal the otherwise exposed area formed by the backing panel and its reflector. Each end cap means is connected to membrane means elements such as an outside reflector, an outside backing panel, an outside spanning member cap means, or an outside load-bearing building member. An end cap means may be unitary or formed from several parts. However, regardless of the method of fabrication, each end cap means is dimensioned and configured so as to form a weathertight seal with the membrane means elements to which the end cap means is connected, thus, sealing the roof. One of ordinary skill in the art, appreciates that the end cap means can vary even within the use on one cover. For example, in an elevated cover design one wall may be raised above the canal spanning member so as to equal or exceed the height of the part of the spanning member cap means, whereas another wall may reach only to the bottom of the backing panel. Thus, in the former case, the end cap means would simply provide a flashing to the wall for the backing panel or the reflector, and the canal spanning member or the spanning member cap means. However, in the latter case, the end cap means would include a panel having a surface that covers the exposed arcuate area formed by the backing panel or the reflector, and the canal spanning member or the spanning member cap means.

In order to keep leaks from occurring between adjacent backing panels or reflectors, the membrane means includes a plurality of weathertight panel sealing means. The panel sealing means, of conventional design, are located at various panel seams including at the curved lateral edges, the upper edge, and the lower edge of each backing panel, at the curved lateral edges, the upper edge, and the lower edge of each reflector, or a combination of the above.

In addition to the structural means and the membrane means, the present invention also comprises elements necessary to gather the reflected solar energy from the reflector. In order to support a reflected solar energy collector, a collector support means is used. A collector support means is disposed above reach row of adjacent reflectors so as to support a collector and allow the collector to move within a predetermined focal zone for collecting solar energy reflected from the stationary reflectors. A plurality of collector support means are used if a plurality of rows with reflectors is used. Each collector support means can comprise a plurality of collector support members which attach to adjacent spanning member cap means or the underlying canal spanning member. Thus, the collector support members span from the top of a first canal spanning member to the top of a second adjacent canal spanning member and have a means for allowing the collector to move in a predetermined path. At least two collector support members are disposed along each row of adjacent reflectors, between said first spanning member and second spanning member. Of course one of ordinary skill in the art may vary the number and placement of the collector support members. In some embodiments, at the end row of reflectors, the collector support members may span from a canal spanning member to a support surface such as the outside wall of the building. However, in total, the collector support members for a collector are dimensioned and configured so as to support that collector, as exposed to the forces of the weather at the canal site.

The necessary partner of the reflector is a reflected solar energy collector. Thus, the present invention includes a secondary collector means, or if a plurality of reflector rows is used, a plurality of collectors. Each collectors is linear and extends lengthwise across the curved lateral edges of a row of adjacent reflectors. For support, each collector is connected to at least two collector support members so as to be disposed to move within a predetermined focal collection zone. Finally, each collector is dimensioned and configured to receive the reflected solar energy into a conduit through which an energy transfer fluid can flow, the fluid being heated by the reflected solar energy. One of ordinary skill in the art can select from a number of commercially available fluids known for this use. As to the cross-sectional shape of the collector, a number of disclosed designs are suitable for the present invention, such as the use of compound parabolic collectors with cylindrically arcuate reflectors, and are known to those of ordinary skill in the art.

In order to maximize the solar energy gathering of the reflector/collector combination, the present invention uses a means for positioning each collector in an optimal position within the focal collection zone throughout a defined solar cycle, such as the diurnal cycle. The collector positioning means is connected to the moveable portion of each collector support means. One of ordinary skill in the art can appreciate that the positioning means can be designed in a variety of ways. For example, the positioning means can comprise an integrated means that couples all of the collectors together through a mechanical means such as gears and chain, moving all the collectors at once. Alternatively, the positioning means can comprise a number of elements, each moving a single collector, such an electrical motor attached to each collector support means.

Finally, the present invention includes a fluid transport means which connects the conduit from each collector to a thermal energy use means or an energy storage means. The fluid transport means circulates the solar energy-heated fluid through the plurality of conduits. Any number of conventional arrangements or systems can be used, and are known to those or ordinary skill in the art.

Cover Without Backing Panels

The second variant of the present invention differs from the first in that a plurality of reflectors is used as part of the membrane means, without the need for backing panels. Thus, the structural means comprises a number of elements, starting with a plurality of canal spanning members as described above in the first variant. Above the canal spanning members lie the reflectors. Each reflector has a concave and cylindrically arcuate configuration of up to 180 degrees, a lower edge, an upper edge, and curved lateral edges. The reflectors are disposed adjacent to one another above the canal spanning members so as to form a row for up to the entire length of the canal spanning member. At least one of the curved lateral edges of at least one reflector disposed in each row attaches either to the upper panel support points of the underlying canal spanning member, to the lower panel support points of the underlying canal spanning member, or to a combination of such upper panel support points and lower panel support points. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying canal spanning member so as to form the row of adjacent reflectors. One of ordinary skill in the art can use various materials to construct a reflector, including fabricated metals or alloys with polished or reflectorized surfaces, and molded laminates or composites with reflectorized surfaces.

As in the first variant, the membrane means includes a plurality of spanning member cap means. Each spanning member cap means is connected either to the top of a canal spanning member or the upper edge of a reflector. Each spanning member cap means extends lengthwise for the length of the canal spanning member and extends laterally across the canal spanning member. Each spanning member cap means is dimensioned and configured so as to form a tight seal with the reflectors and the canal spanning member over which the spanning cap means is disposed.

Another membrane means element is the end cap means. The present invention includes a plurality of end cap means, each being situated or disposed at the end of the canal spanning member, so as to seal the exposed area formed by the reflector. Each end cap means is connected to membrane means elements such as an outside reflector, an outside spanning member cap means, or an outside load-bearing building member. An end cap means may be unitary or formed from several parts. However, regardless of the method of fabrication, each end cap means is dimensioned and configured so as to form a weathertight seal with the membrane means elements to which the end cap means is connected, thus, sealing the membrane means. One of ordinary skill in the art, appreciates that the end cap means can vary even within the use of one cover. For example, if an elevated cover is used, one wall of a building may be raised above the canal spanning member so as to equal the height of the part of the spanning member cap means, whereas another wall may reach only to the bottom of the reflector. Thus, in the former case, the end cap means would simply provide a flashing to the wall for the reflector and the canal spanning member or the spanning member cap means. However, in the latter case, the end cap means would include a panel having a surface that covers the exposed arcuate area formed by the reflector, and the canal spanning member or the spanning member cap means.

In order to keep leaks from occurring between adjacent reflectors, the membrane means includes a plurality of weathertight panel sealing means. The panel sealing means, of conventional design, are located at various seams including at the curved later edges, the upper edge, and the lower edge of each reflector.

In addition to the structural means and the membrane means, the second variant of the present invention also comprises elements necessary to gather the reflected solar energy from the reflector. These elements, the collector support means, the secondary collector means, the collector positioning means, and the fluid transport means are as described above in the first variant.

If photo-voltaic panels are used to collect solar energy and convert it in to electrical energy, then one has the option of either using a backing panel as part of the membrane means or mounting the photo-voltaic panel directly as part of the membrane means. Unlike a primary reflector means, the photo-voltaic panels do not have to have an arcuate shape, and in fact, preferably are flat panels.

BEST MODES FOR CARRYING OUT THE INVENTION

Figure 1:
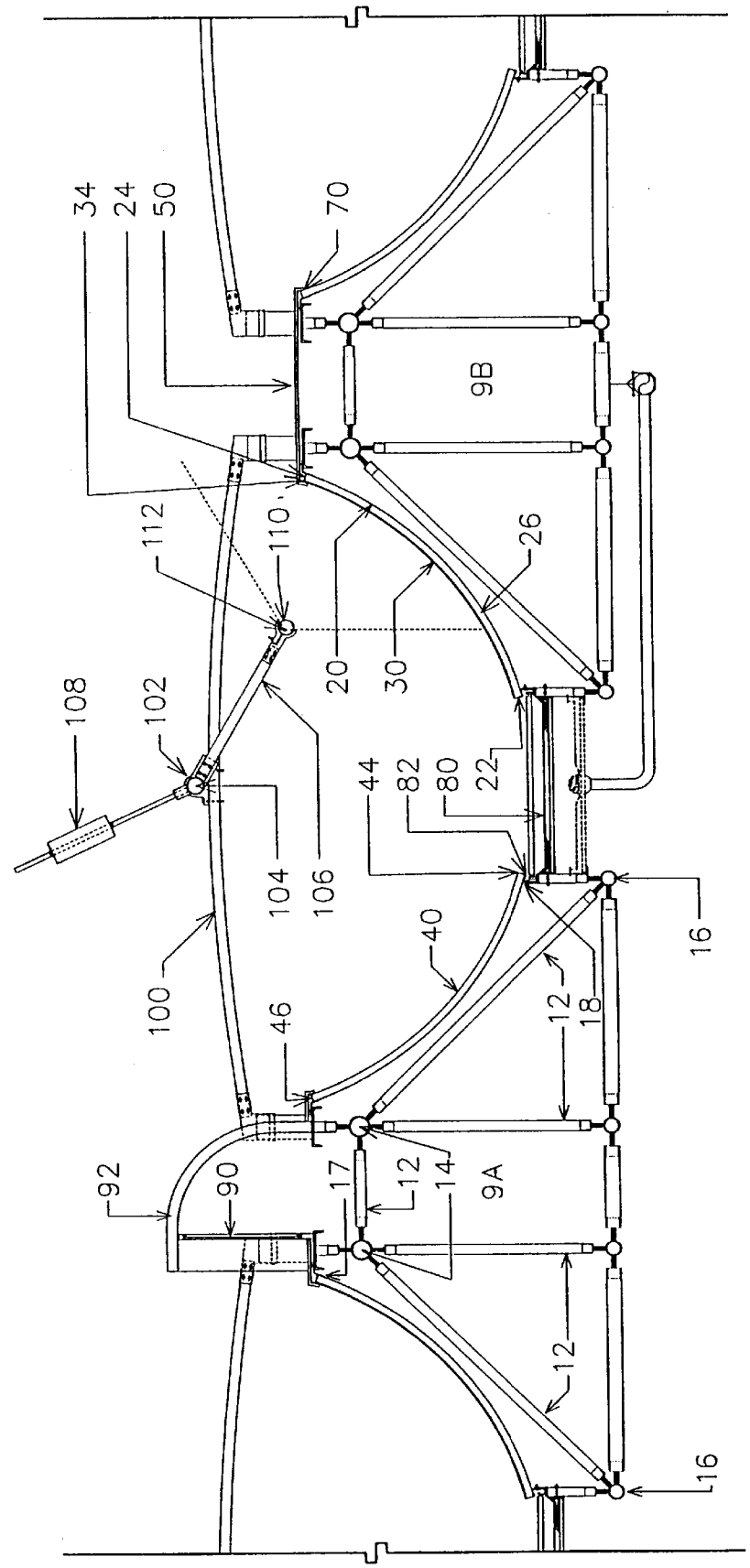
FIG. 1 is a sectional view of an embodiment of the present invention using a complex space truss, an upright daylighting means, and a gutter means.

The relationship between the cover and the underlying canal are shown in FIGS. 16 to 19. A conventional canal typically transports water (120) by means of a combination of a bottom surface (122), usually of concrete, connected to side walls (124). A first load-bearing member or surface (126) is disposed about the top of the first side wall of the canal. A second load-bearing member (128) is disposed on the opposing canal side wall. The membrane means of the cover encloses the canal such that evaporative loss is substantially eliminated. The structural support means for the membrane means, such as a series of space or flat trusses, extends above and across the upper surface of the water. The trusses are supported by the first and second load-bearing members. While FIGS. 16 to 19 illustrate parallel and perpendicular orientations for the panels and thus, the underlying trusses, one of ordinary skill in the art can understand that, in some cases, one would orient the panels at an angle between these orientations.

Also, while FIGS. 1 to 19 show the present invention in embodiments using reflectors, as described above, photo-voltaic panels can be substituted for the use of reflectors, and thus, for reflectors as shown in any of the preferred embodiments described below. In any such substitution, one would, of course, no longer need a secondary reflected solar energy collector and its associated means and elements.

Single Row Cover Embodiments

One preferred embodiment of the present invention uses a design wherein only one row of reflectors having an arcuate configuration of up to about 120 degrees is placed between adjacent canal spanning members, or a canal spanning member and an outside wall. A non-reflective roofing panel is used to extend from the lower edge of the reflector to the top of the canal spanning member nearest the lower edge of that reflector. This embodiment can have two main variants, one that uses backing panels, and another that does not. In both, the structural means comprises a plurality of canal spanning members as described above.

Using Backing Panels

In the first variant of the single reflector row embodiment, a plurality of backing panels is used as part of the membrane means. Each backing panel has a concave and cylindrically arcuate configuration of up to about 120 degrees, a lower edge, an upper edge, and curved lateral edges. The backing panels are disposed adjacent to one another in a single row between adjacent canal spanning members for up to the entire length of the canal spanning members. At least one of the curved lateral edges of at least one backing panel disposed in each row attaches either to the upper panel support points of the underlying canal spanning member, to the lower part support points of the underlying canal spanning member, or to a combination of the above. Each backing panel is disposed such that the skyward surface is the concave surface. Also, each backing panel is dimensioned and configured along the curved lateral edges wherein the curved lateral edge of a backing panel can be placed laterally adjacent along the curved lateral edge of another backing panel for the length of the underlying canal spanning member so as to form the row of adjacent backing panels. One of ordinary skill in the art can use various materials to construct a backing panel, including fabricated metals or alloys, and molded laminates or composites. Preferably, the backing panel is a sandwich laminate having aluminum sheet skin on either side and a core of insulating structural foam.

Non-reflective roofing panels are used to close the gap between the lower edge of a backing panel and the top of the canal spanning member closest to the lower edge of the backing panel or to a load-bearing member closest to the lower edge of the backing panel. Each non-reflective roofing panel has lateral edges, a lower edge, and an upper edge. The non-reflective roofing panel can be curved or flat. The lower edge of the non-reflective roofing panel attaches either to the lower edge of an adjacent backing panel or to a lower panel support point. The upper edge of the non-reflective roofing panel either attaches to the top of a canal spanning member adjacent to the canal spanning member supporting the upper edge of the adjacent backing panel, said canal spanning member being closest to the lower edge of the backing panel, attaches to an upper panel support point on said adjacent canal spanning member, or attaches to a load-bearing member close to the lower edge of the backing panel. Each non-reflective roofing panel is dimensioned and configured along the lateral edges wherein the lateral edge of a non-reflective roofing panel can be placed adjacent to the lateral edge of another non-reflective roofing panel for the length of the underlying canal spanning member, so as to form a row of adjacent non-reflective roofing panels, along with the row of reflectors, between adjacent canal spanning members.

On top of each backing panel lies a reflector. Thus, this first variant also comprises a plurality of solar energy concentrating reflectors. Each reflector can be flexible and rely upon an underlying backing panel for support, or a reflector can have a concave and cylindrically arcuate configuration complementary to the underlying backing panel. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying backing panel.

As part of the membrane means elements that form a weathertight seal, the present preferred embodiment includes a plurality of spanning member cap means, end cap means, and a plurality of weathertight panel sealing means, all as described above.

In addition to the structural means and the membrane means, the present preferred embodiment also comprises elements necessary to gather the reflected solar energy from the reflector, namely, a plurality of collector support means, a plurality of reflected solar energy collectors, a means for positioning each collector in an optimal position within the focal collection zone, and a fluid transport means, all as described above.

Figure 5:
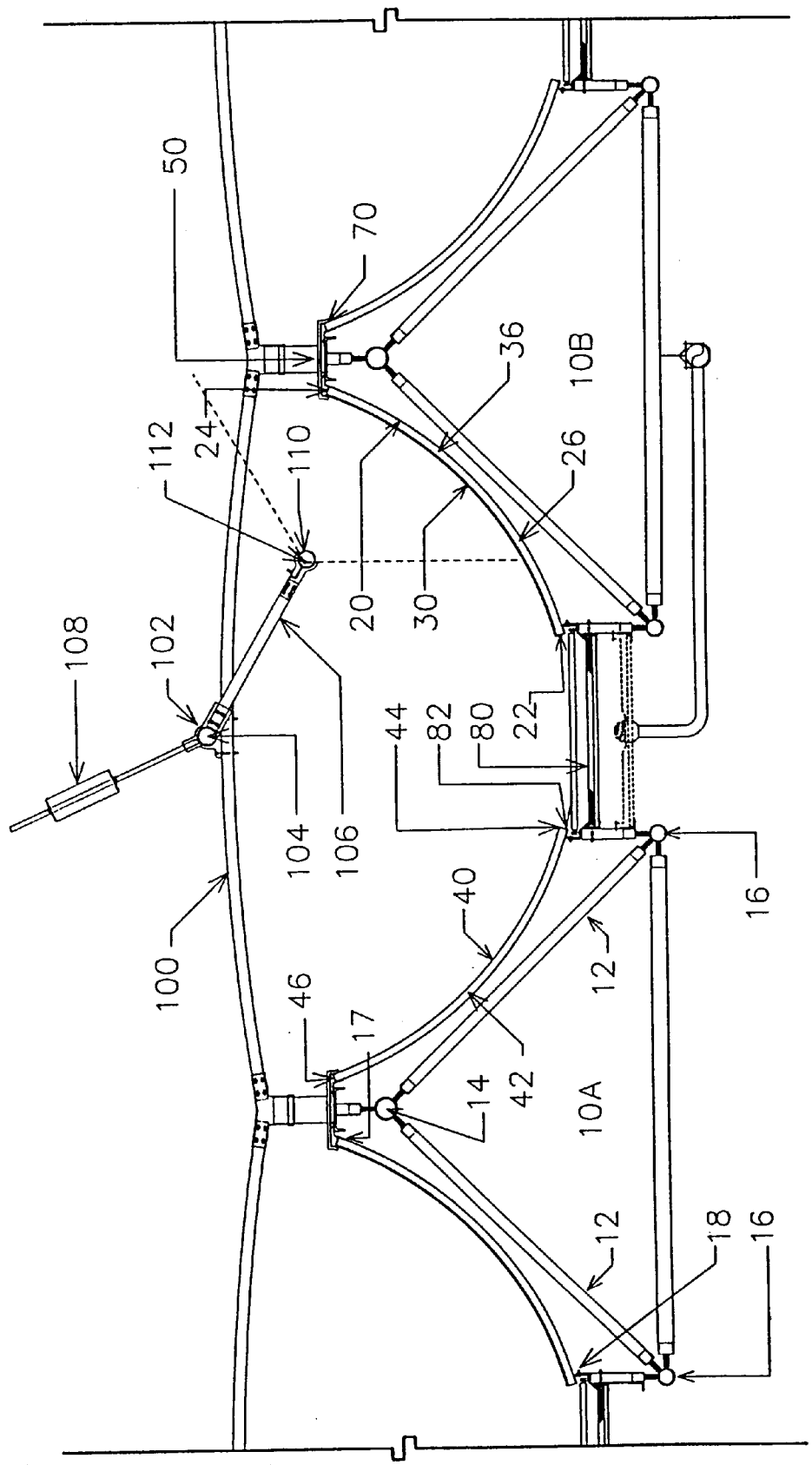
FIG. 5 is sectional view of an embodiment of the present invention using a simple space truss and a single row of reflectors.
Figure 6:
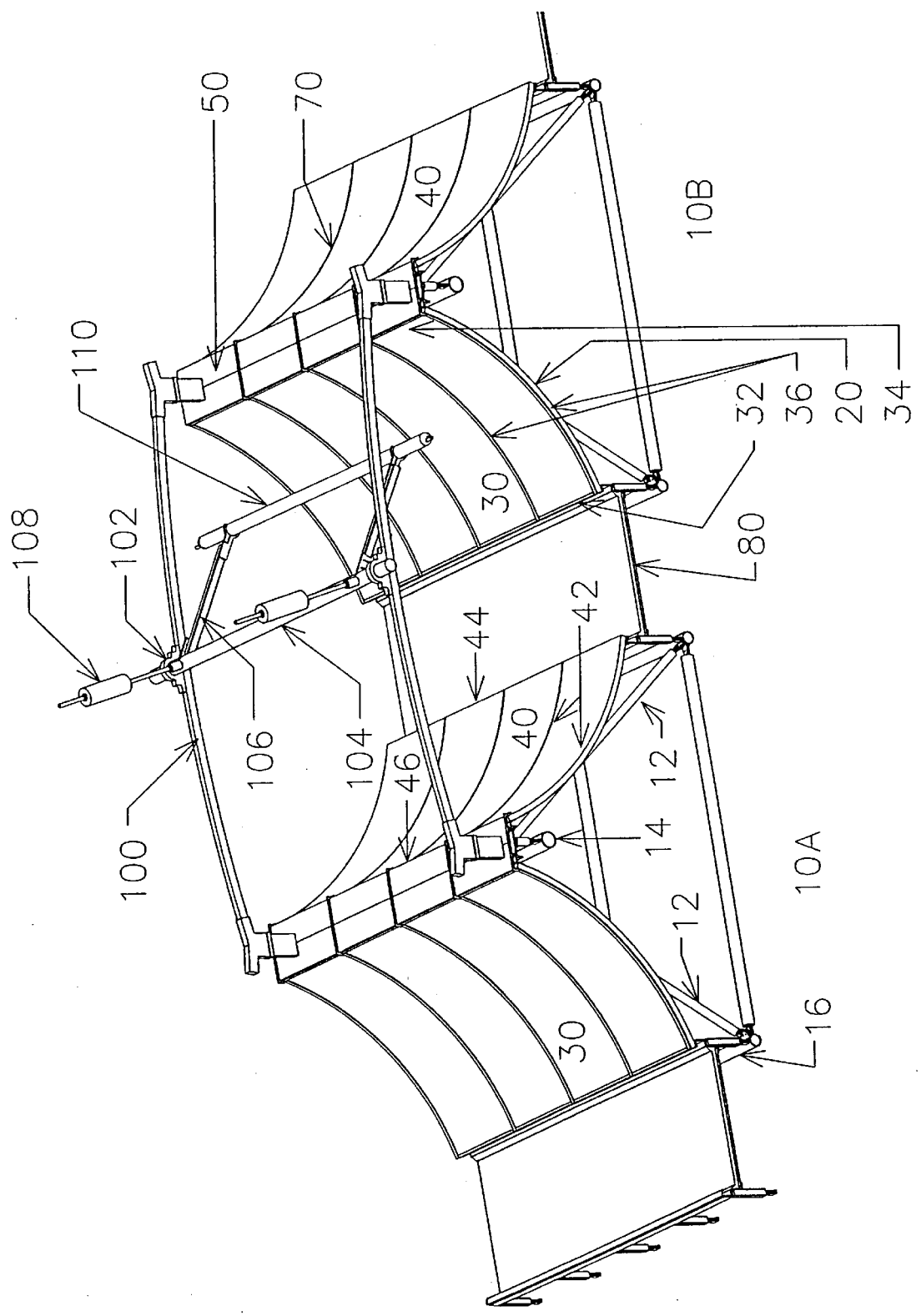
FIG. 6 is an isometric view of the embodiment in FIG. 5.
Figure 7:
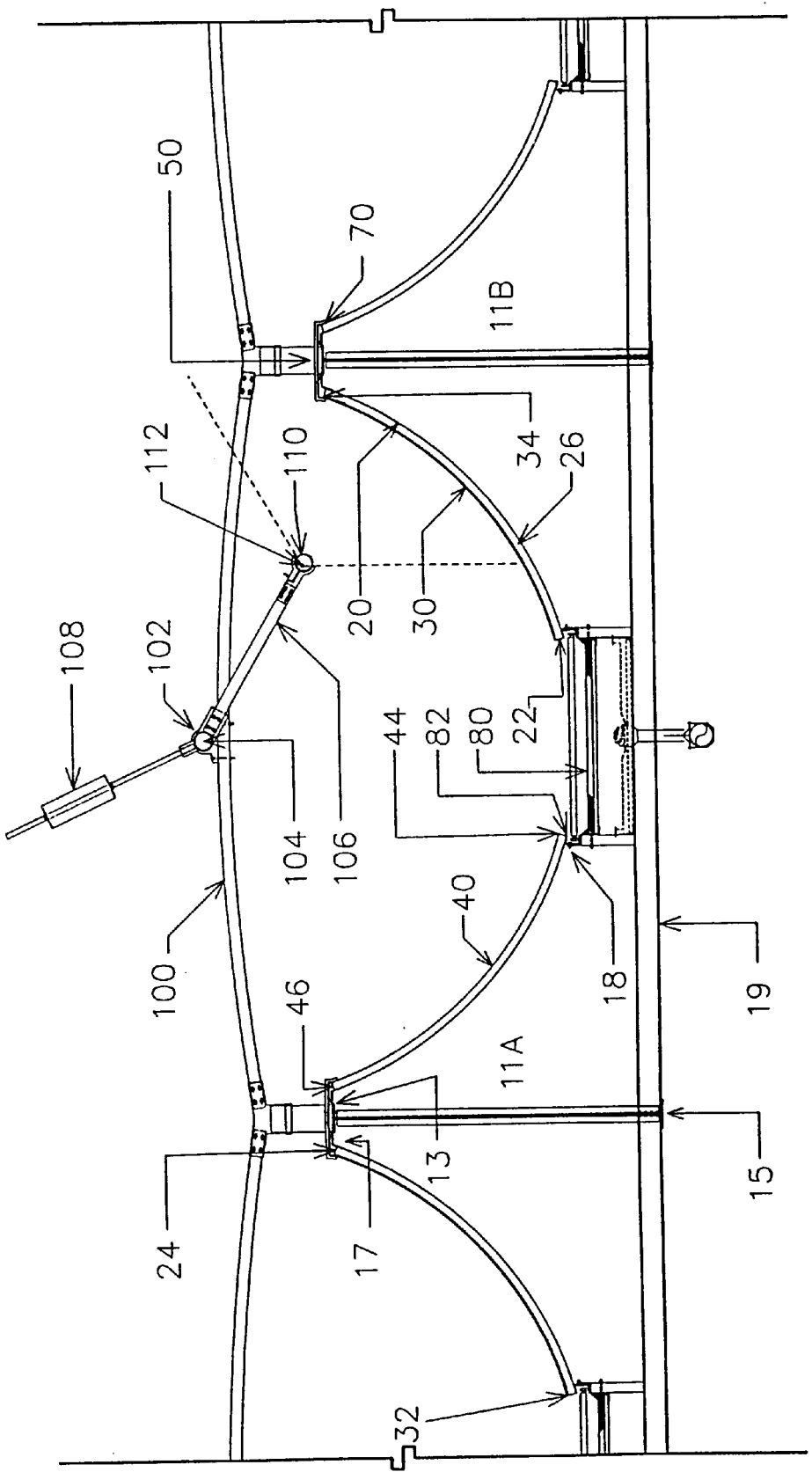
FIG. 7 is sectional view of an embodiment of the present invention using a flat truss and a single row of reflectors.
Figure 8:
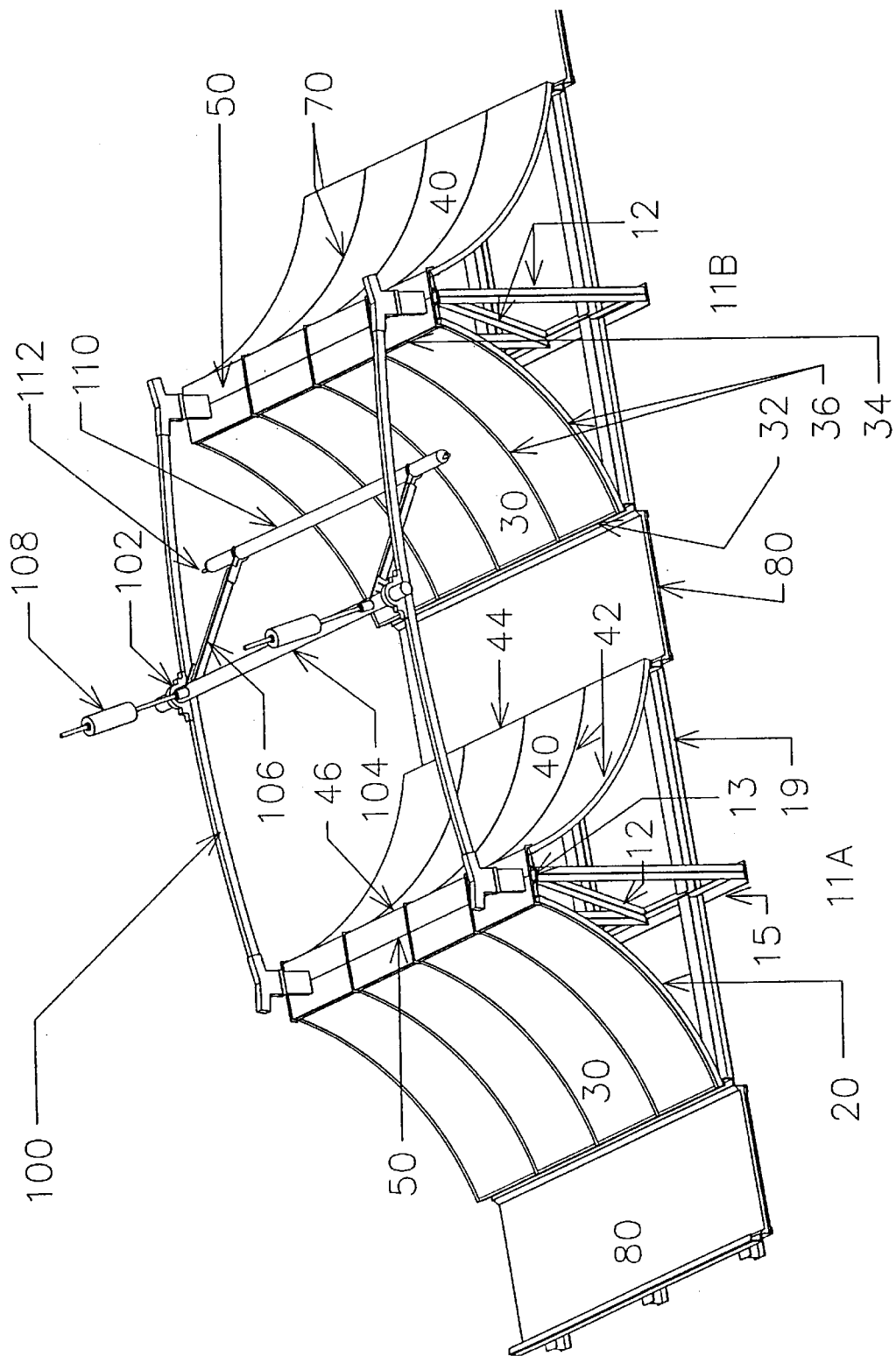
FIG. 8 is an isometric view of the embodiment in FIG. 7.

FIGS. 5 and 6 illustrate the variant of the single reflector row design that uses backing panels. One would prefer to orient the canal spanning members of the new structure such that the collector in the present invention is oriented in a lengthwise direction, i.e., follows the direction formed by the lower edge of the reflectors, which is within 30 degrees of a true East-West axis. However, the present invention can be used in other orientations. In this preferred embodiment, a plurality of simple space trusses (10A and 10B) are used as the canal spanning members. Each simple space truss has a plurality of web members (12) disposed between an upper chord (14) and two lower chords (16), one on either side of and below the upper chord. A plurality of web members (12) connect the upper chord to the lower chords. Upper panel support points (17) are located near the upper chord, and the lower panel support points (18) are located near the lower chords, on top of short vertical members. The simple space trusses are dimensioned and configured to support the weight of all of the supported elements described below, as well as conventional dead loads and live loads, such as wind and snow. Alternately, FIGS. 7 and 8 show the same system except using flat trusses (11A and 11B) instead of simple space trusses.

With the present covered canal, a backing panel (20) underlies each solar energy concentrating reflector (30). This backing panel has a concave and cylindrically arcuate configuration of up to about 120 degrees, a lower edge (22), an upper edge (24), and curved lateral edges (26). The backing panels are dimensioned and configured along the curved lateral edges such that one backing panel can be located laterally adjacent to another backing panel so as to form a row of backing panels extending for up to the length of the underlying space truss. In addition, the backing panel is made so as to provide dimensional or configurational stability to the overlying reflector. Suitable embodiments of the backing panel include a sandwich laminate having aluminum sheet skin on either side of a core of insulating structural foam.

A plurality of flexible solar energy concentrating reflectors are used. Each reflector (30) is flexible enough to assume a concave and cylindrically arcuate configuration complementary to the underlying backing panel. Each reflector has a lower edge (32), an upper edge (34), and, when in place, curved lateral edges (36). The skyward surface of the reflector is the concave surface. Each reflector is dimensioned and configured along the lateral edges such that one reflector can be located adjacent to another reflector so as to form a row of reflector extending for up to the length of the underlying space truss. Such a reflector can be comprised of a ultraviolet-stabilized plastic having a reflectorized concave surface. Particularly suitable for reflectors is an ultraviolet-stabilized acrylic having a thickness of 1.6 mm wherein the underside of the concave surface of the acrylic has aluminum vapor-deposited thereon, providing a reflectivity of at least 75%, preferably at least 90%. Alteratively, the reflector can be made from co-extruded polymers having a reflectivity based on the difference in the indices of refraction of the two polymers.

Non-reflective roofing panels are used to close the gap between the lower edge of a reflector and the top of the canal spanning member closest to the lower edge of the reflector or to a load-bearing member closest to the lower edge of the reflector panel. Each non-reflective roofing panel (40) has lateral edges (42), a lower edge (44), and an upper edge (46). The lower edge attaches to a lower panel support point. The upper edge attaches to an upper panel support point on top of a simple space truss (10A) adjacent to the simple space truss (10B) supporting the upper edge of the adjacent reflector. Each non-reflective roofing panel is dimensioned and configured along the lateral edges wherein the lateral edge of a non-reflective roofing panel can be placed adjacent to the lateral edge of another non-reflective roofing panel extending for up to the length of the underlying canal spanning member, so as to form a row of adjacent non-reflective roofing panels.

As part of the membrane means elements that form a weathertight seal, the present invention includes a plurality of spanning member cap means (50). Each spanning member cap means is connected to the top of a canal spanning member. Each spanning member cap means extends lengthwise for the length of the canal spanning member and extends laterally across the canal spanning member. As shown in the FIGURES, each spanning member cap means is dimensioned and configured so as to form a weathertight seal with the backing panels, the non-reflective roofing panels, and the canal spanning member over which the spanning cap means is disposed.

Figure 9:
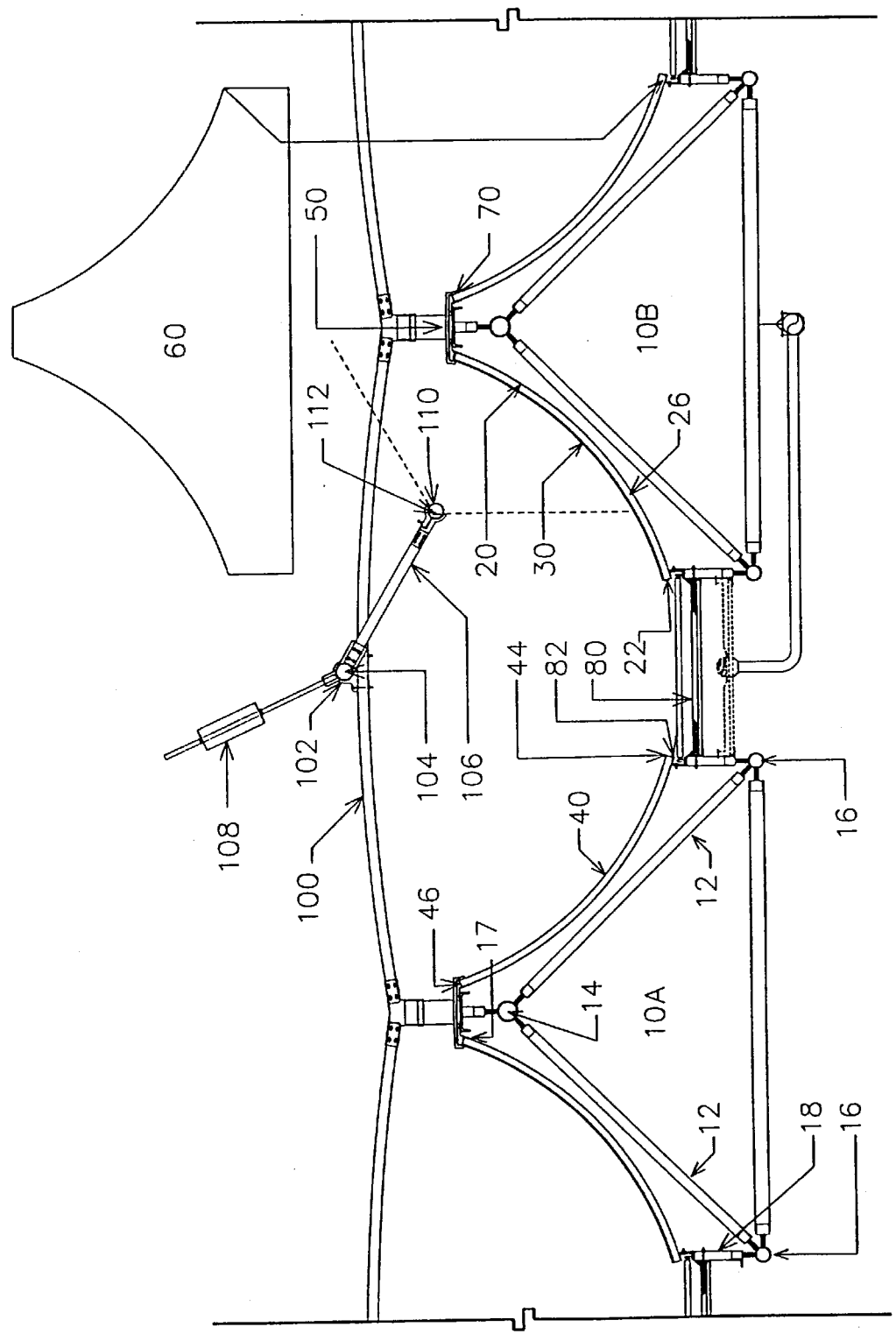
FIG. 9 is a sectional view of an embodiment of the present invention highlighting an end cap means.
Figure 10:
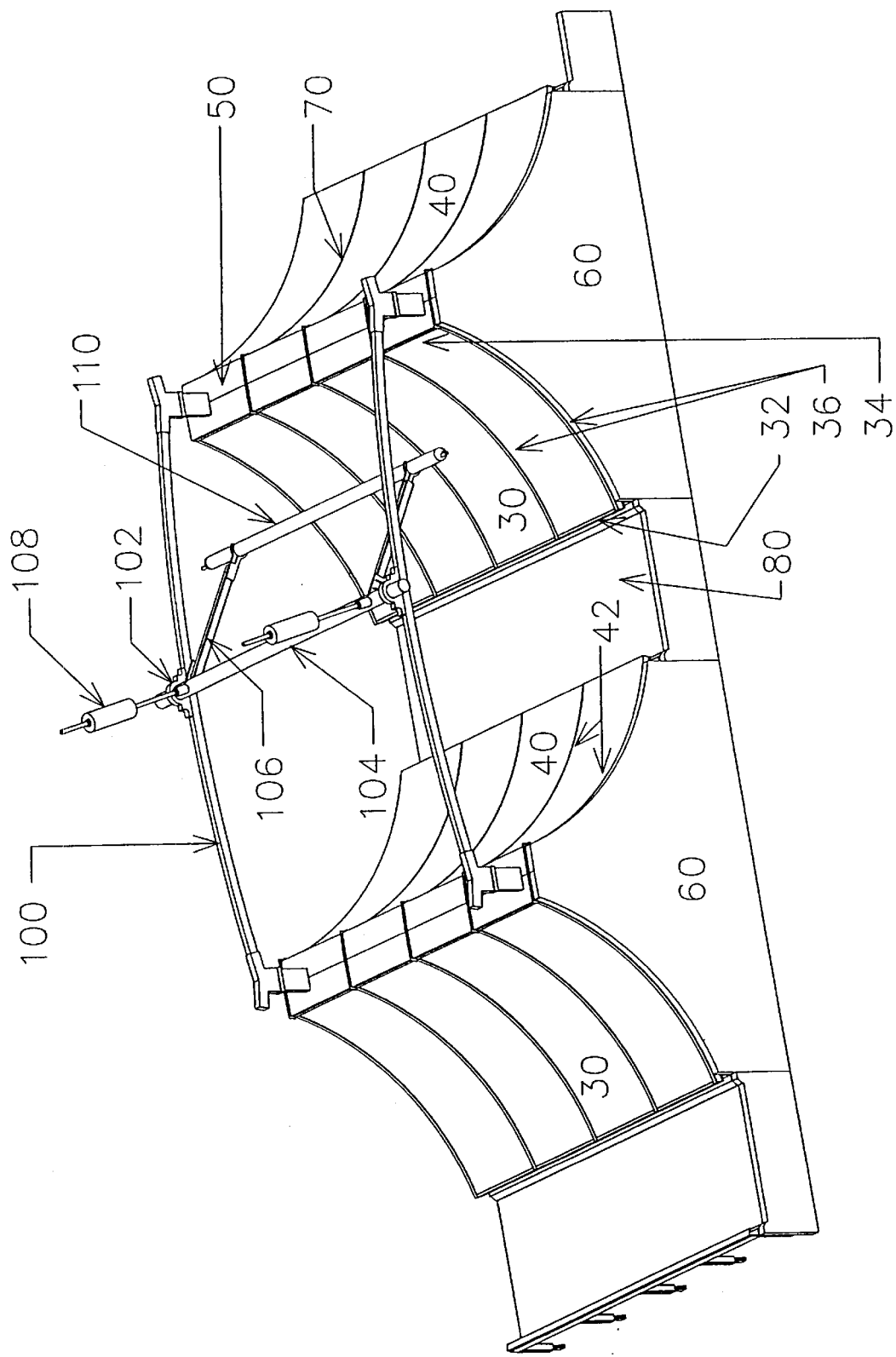
FIG. 10 is an isometric view of the embodiment in FIG. 9.
Figure 11:
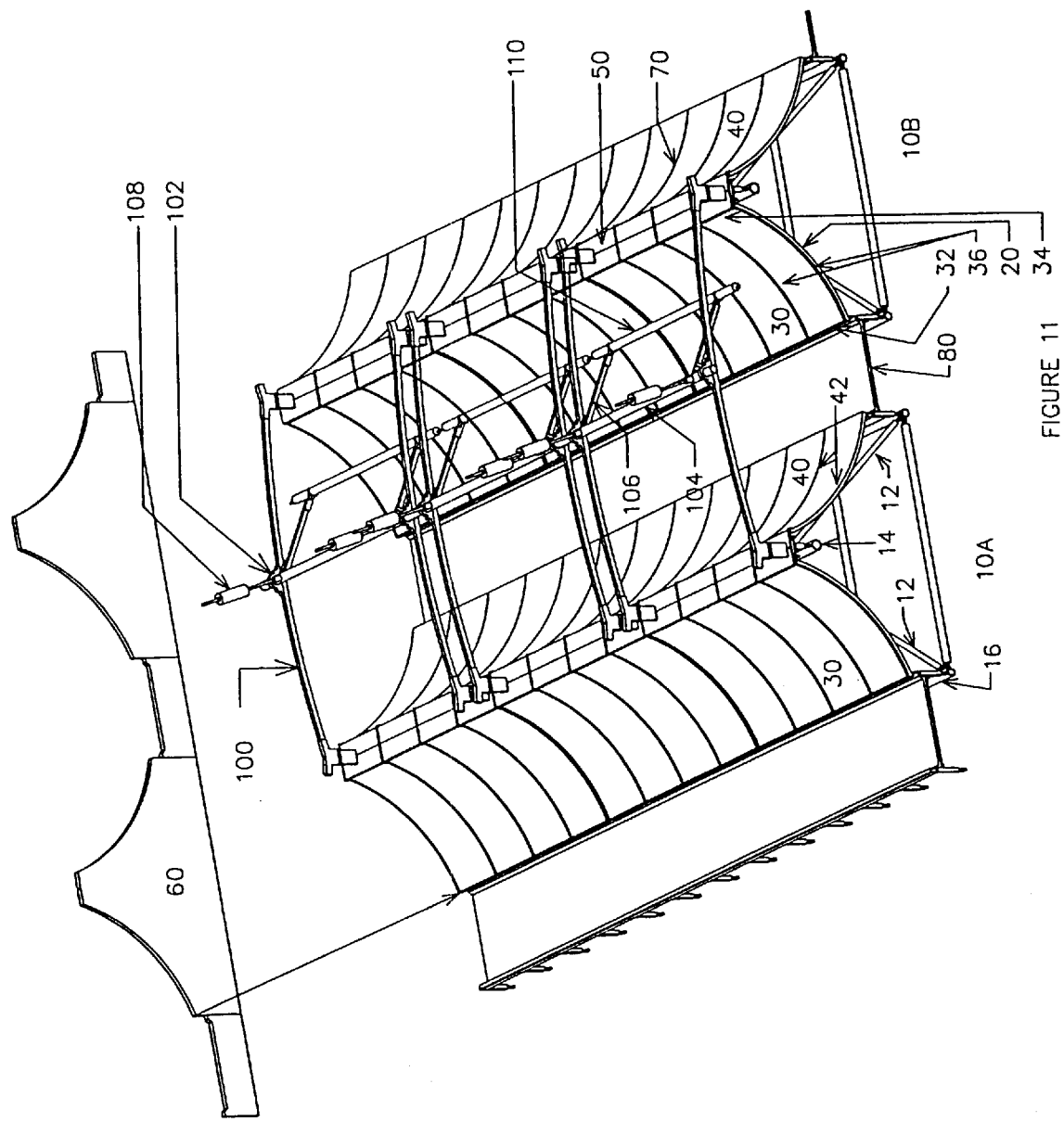
FIG. 11 is an isometric view of an embodiment of the present cover for a canal.
Figure 12:
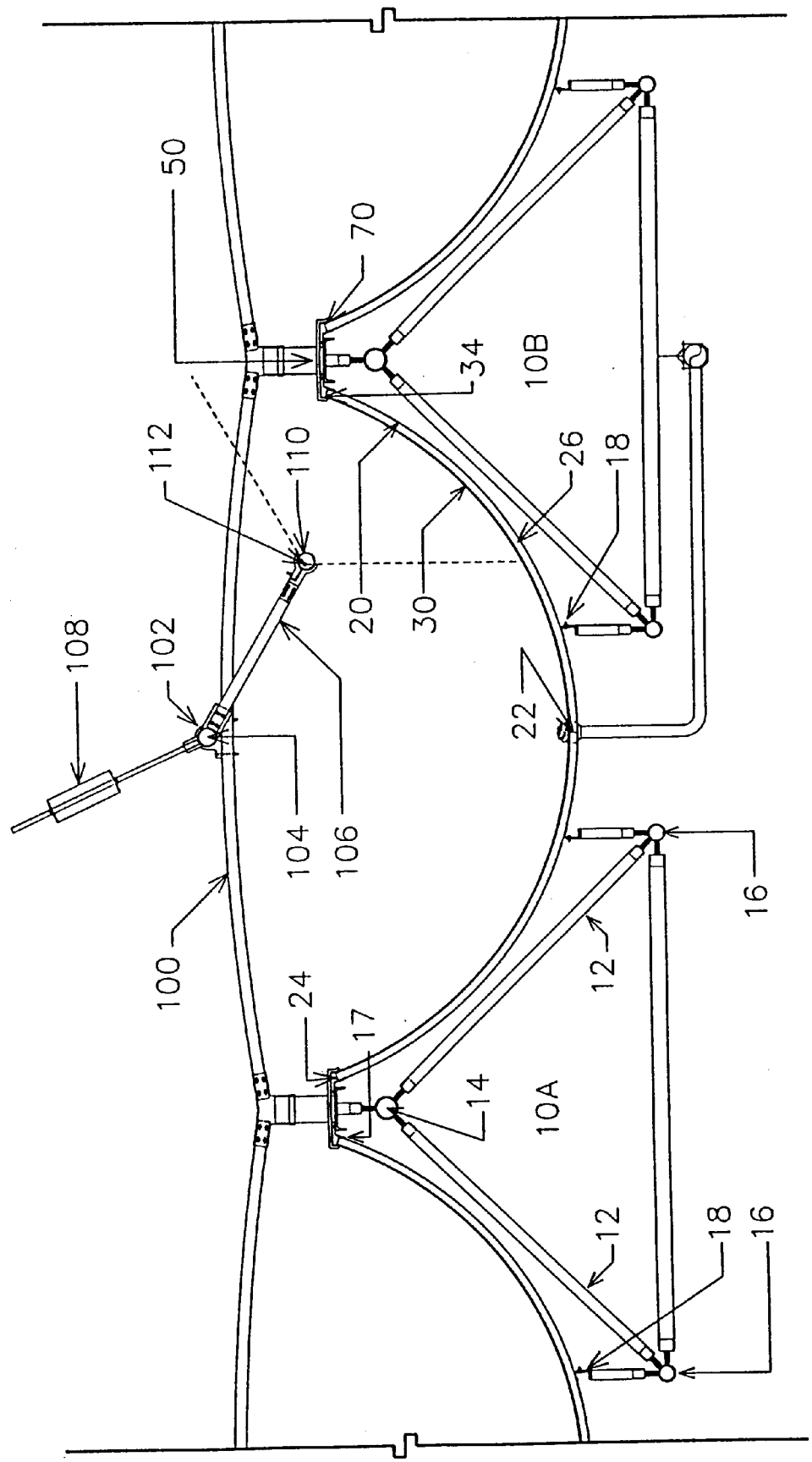
FIG. 12 is a sectional view of an embodiment of the present invention using no gutter means and a double row of reflectors.
Figure 13:
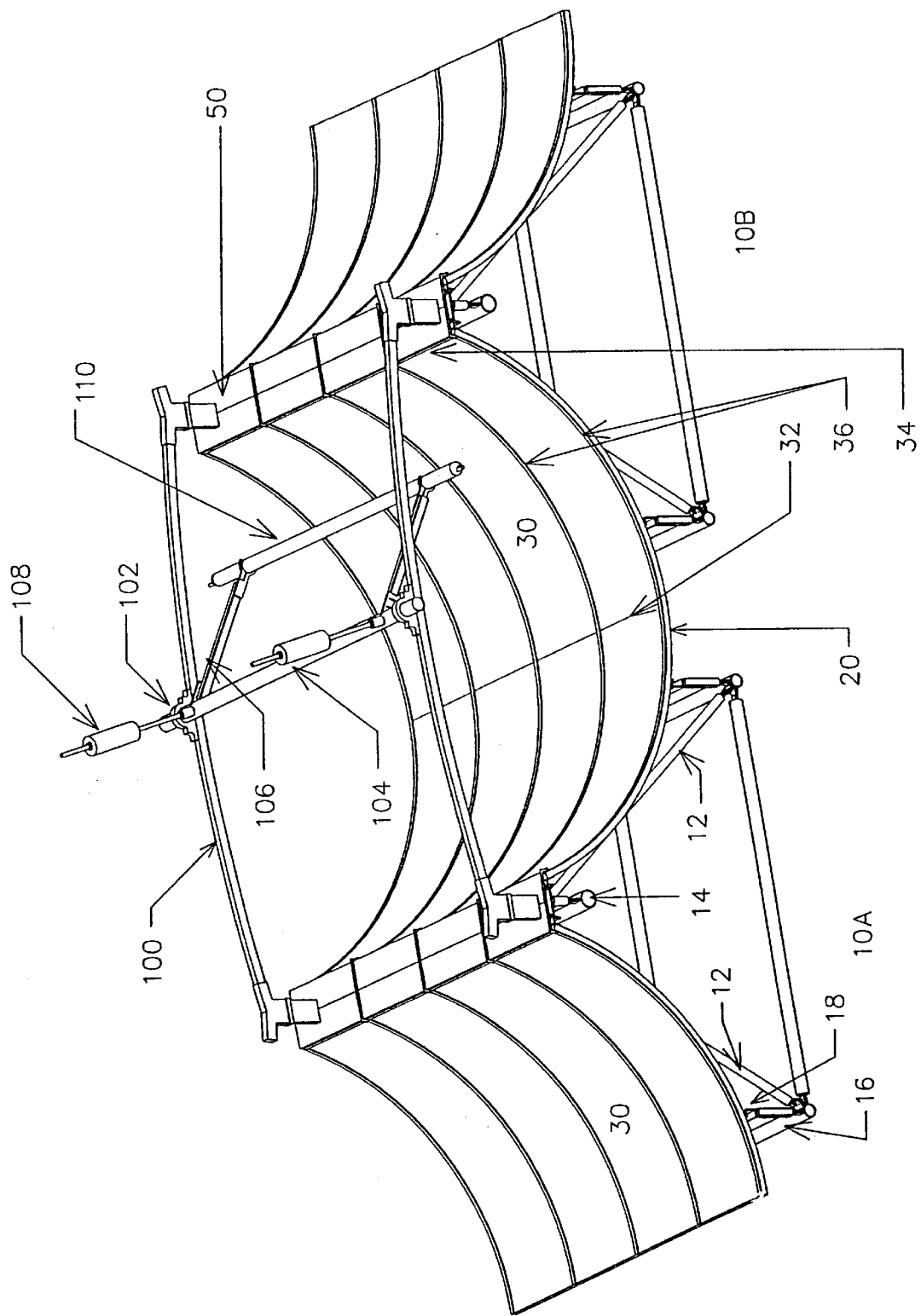
FIG. 13 is an isometric view of the embodiment in FIG. 12.

Another membrane means element is the end cap means, as shown in FIGS. 9, 10, and 11. The present covered canal includes a plurality of end cap means, each end cap means (60) being situated or disposed at the outside or end of the canal spanning member, so as to seal the exposed end formed by the backing panel and its reflector. Each end cap means is connected to an outside backing panel, an outside non-reflective panel, or the outside spanning member cap means. Each end cap means is dimensioned and configured so as to form a seal with the membrane means elements to which the end cap means is connected, thus, sealing the cover.

In order to keep leaks from occurring between adjacent backing panels or reflectors, the present invention includes a plurality of weathertight panel sealing means. The panel sealing means (70), of conventional design, are located at various seams including at the lateral edges, the upper edge, and the lower edge of each backing panel, at the lateral edges, the upper edge, and the lower edge of each non-reflective roofing panel.

A collector support means spans above and across the row of reflectors, extending from the spanning member cap means of a first canal spanning member (10A) to the spanning member cap means of a second canal spanning member (10B). As shown in FIGS. 5 and 6, the collector support means comprises two arches (100) as the collector support members. Each arch spans from the spanning member cap means (50) on one space truss to the spanning member cap means of a second space truss. A bearing means (102) is located on each arch. A drive shaft (104) is connected to the bearing means on each arch so as to comprise a rotating means located at the center of curvature for the underlying reflector. Lower support members (106) are connected to the drive shaft.

A reflected solar energy collector (110) is connected to the collector support means by the lower support members. The preferred collector for a cylindrically arcuate reflector has a compound parabolic design, as disclosed in U.S. Pat. No. 4,002,499 or U.S. Pat. No. 5,274,497, both to Winston. The collector has a conduit (112) through which an energy transfer fluid can be heated and circulated.

The drive shaft is located at the center of curvature for the solar energy concentrating reflector. The lower support members (106) are dimensioned such that the solar energy collector is located down from the center of curvature by a distance L plus or minus 5% according to the formula: $L=(R * 1.1)/2$; where R equals the radius of the curvature of the solar energy concentrating reflector. The above arrangement of elements allows the solar energy collector to move within a predetermined and defined focal zone for collecting reflected solar energy from the solar energy concentrating reflector.

In preferred embodiments, a counterweight (108) is attached to the drive shaft (104). The counterweight extends up from the drive shaft member at an angle and a distance with respect to the collector and having a sufficient mass or weight such that if a means for positioning the collector is disconnected from controlling the rotating means, then the counterweight rotates the collector outside of the focal collection zone.

A means for positioning the collector is connected to the drive shaft (104). The positioning means comprises an electrical motor hooked to a microprocessor which can keep the collector in an optimal position for collecting reflected solar energy throughout the diurnal solar cycle. The positioning means has an electromagnetic clutch which can disconnect control of the step motor over the position of the drive shaft member, (not shown). A signal, or a lack of one, can come from one of three means (not shown)—a temperature sensor means, a pressure sensor means, or a position sensor means. In some embodiments, a combination of such elements can be used. If the signal, or a lack thereof, indicates conditions outside of predetermined limits, then the electromagnetic clutch releases the drive shaft and the collector is automatically moved away from the optimal position in the focal collection zone by gravity.

A fluid transport system (not shown) connects the conduit of each collector to a thermal energy use means or an energy storage means. The fluid transport means circulates the solar energy-heated fluid. Suitable energy transfer fluids include distilled water, but more preferably for high temperature application include silicone heat transfer fluid (HTF), organic synthetic HTF, or inhibited glycol HTF.

Using Reflectors Without Backing Panels

In the second variant of the single row reflector embodiment of the present invention, a plurality of reflectors is used as part of the membrane means, without the need for backing panels. The structural means comprises a plurality of canal spanning members, as described above. Each reflector has a concave and cylindrically arcuate configuration of up to about 120 degrees, a lower edge, an upper edge, and curved lateral edges. The reflectors are disposed adjacent to one another in a single row between adjacent canal spanning members for up to the entire length of the canal spanning members. At least one of the curved lateral edges of at least one reflector disposed in each row attaches either to the upper panel support points of the underlying canal spanning member, to the lower panel support points of the underlying canal spanning member, or to a combination of the above. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying canal spanning members so as to form the single row of adjacent reflectors between adjacent canal spanning members. One of ordinary skill in the art can use various materials to construct a reflector including fabricated metals or alloys with polished or reflectorized surfaces, and molded laminates or composites with reflectorized surfaces.

Non-reflective roofing panels are used to close the gap between the lower edge of the reflectors and the top of the canal spanning member closest to the lower edge of the reflector or to a load-bearing member closest to the lower edge of the reflector panel. Each non-reflective roofing panel has lateral edges, a lower edge, and an upper edge dimensioned and configured as described above. The lower edge attaches either to the lower edge of an adjacent reflector or to a lower panel support point. The upper edge either attaches to the top of a canal spanning member adjacent to the canal spanning member supporting the upper edge of the adjacent reflector, said canal spanning member being closest to the lower edge of the reflector, attaches to an upper panel support point on said adjacent canal spanning member, or attaches to a load-bearing member close to the lower edge of the reflector. These non-reflective roofing panels can be either transparent or translucent.

As part of the membrane means elements that form a weathertight seal, the present invention includes a plurality of spanning member cap means, a plurality of end cap means, and a plurality of weathertight panel sealing means, all as described above.

In addition to the structural means and the membrane means, the present invention also comprises elements necessary to gather the reflected solar energy from the reflector. These elements are the same as described above.

Double Row Cover Embodiments

An alternative preferred embodiment of the present invention is to provide for a pair of reflectors between adjacent canal spanning member, such that abutted lower edge to lower edge, they can form an up to a 180 degree cylindrically arcuate form. As in the single row embodiments, there are two main variants. The first uses backing panels, while the second does not. As in other embodiments, the covered canal comprises a number of elements, starting with a plurality of canal spanning members as described above.

Using Backing Panels

In the first variant of the double row embodiment, a plurality of backing panels is used as part of the membrane means. Each backing panel has a concave and cylindrically arcuate configuration of up to 90 degrees, a lower edge, an upper edge, and curved lateral edges. The backing panels are disposed adjacent to one another along the respective curved lateral edges to form a first row and a second row between adjacent canal spanning members for up to the entire length of the canal spanning members. The first row and the second row are disposed such that the lower edges of the backing panels in the first row are adjacent to the lower edges of the backing panels in the second row. At least one of the curved lateral edges of at least one backing panel disposed in each row attaches either to the upper panel support points of the underlying canal spanning member, to the lower panel support points of the underlying canal spanning member, or to a combination of the above. One of ordinary skill in the art can vary the support points allowed through changing the strength of the backing panel. Thus, each backing panel need not be attached to support points. Each backing panel is disposed such that the skyward surface is the concave surface. Also, each backing panel is dimensioned and configured along the curved lateral edges wherein the curved lateral edge of a backing panel can be placed adjacent along the curved lateral edge of another backing panel for the length of the underlying canal spanning member so as to form the row of adjacent backing panels. One of ordinary skill in the art can use various materials to construct a backing panel, including fabricated metals or alloys, and molded laminates or composites.

On top of each backing panel lies a reflector as described above in the Single Row Cover Embodiment section.

As part of the membrane means elements that form a seal, the present invention includes a plurality of spanning member cap means, a plurality of end cap means, and a plurality of weathertight panel sealing means, also as described above.

In addition to the structural means and the membrane, the present invention also comprises elements necessary to gather the reflected solar energy from the reflector. These solar energy gathering elements are the same as described above in the first variant of the single row embodiment.

Figure 14:
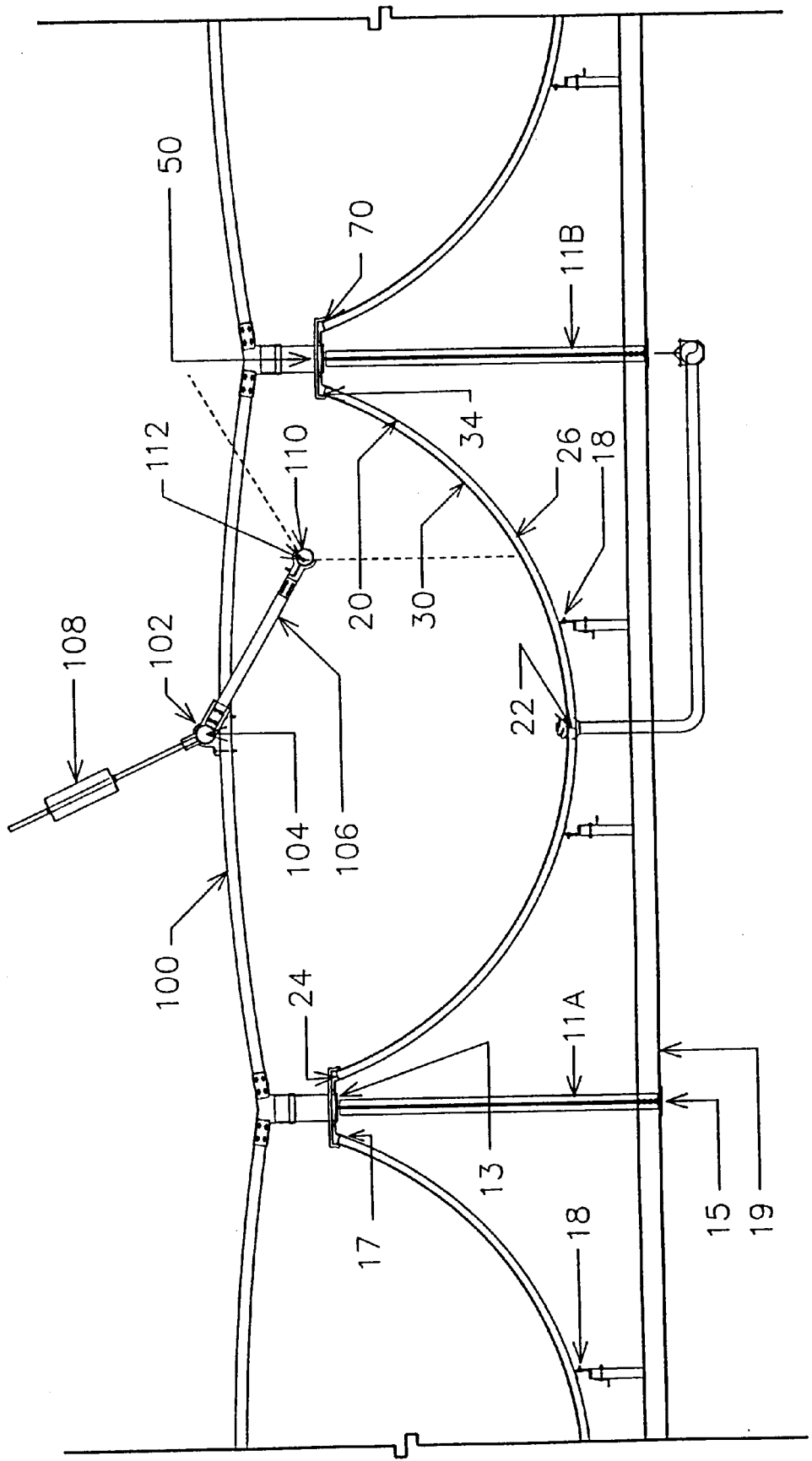
FIG. 14 is a sectional view of an embodiment of the present invention using a flat truss and a double row of reflectors.
Figure 15:
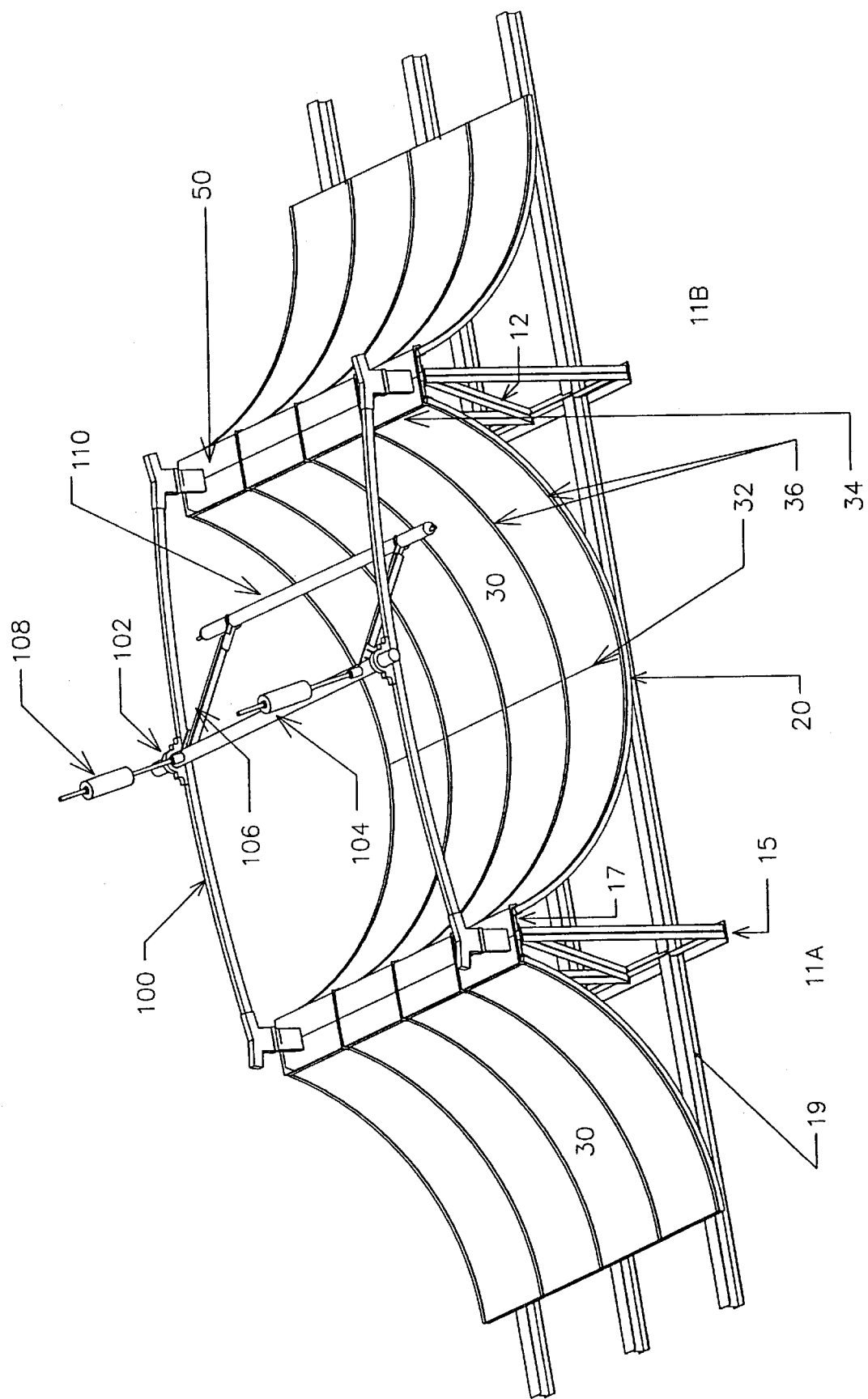
FIG. 15 is an isometric view of the embodiment of FIG. 14.
Figure 16:
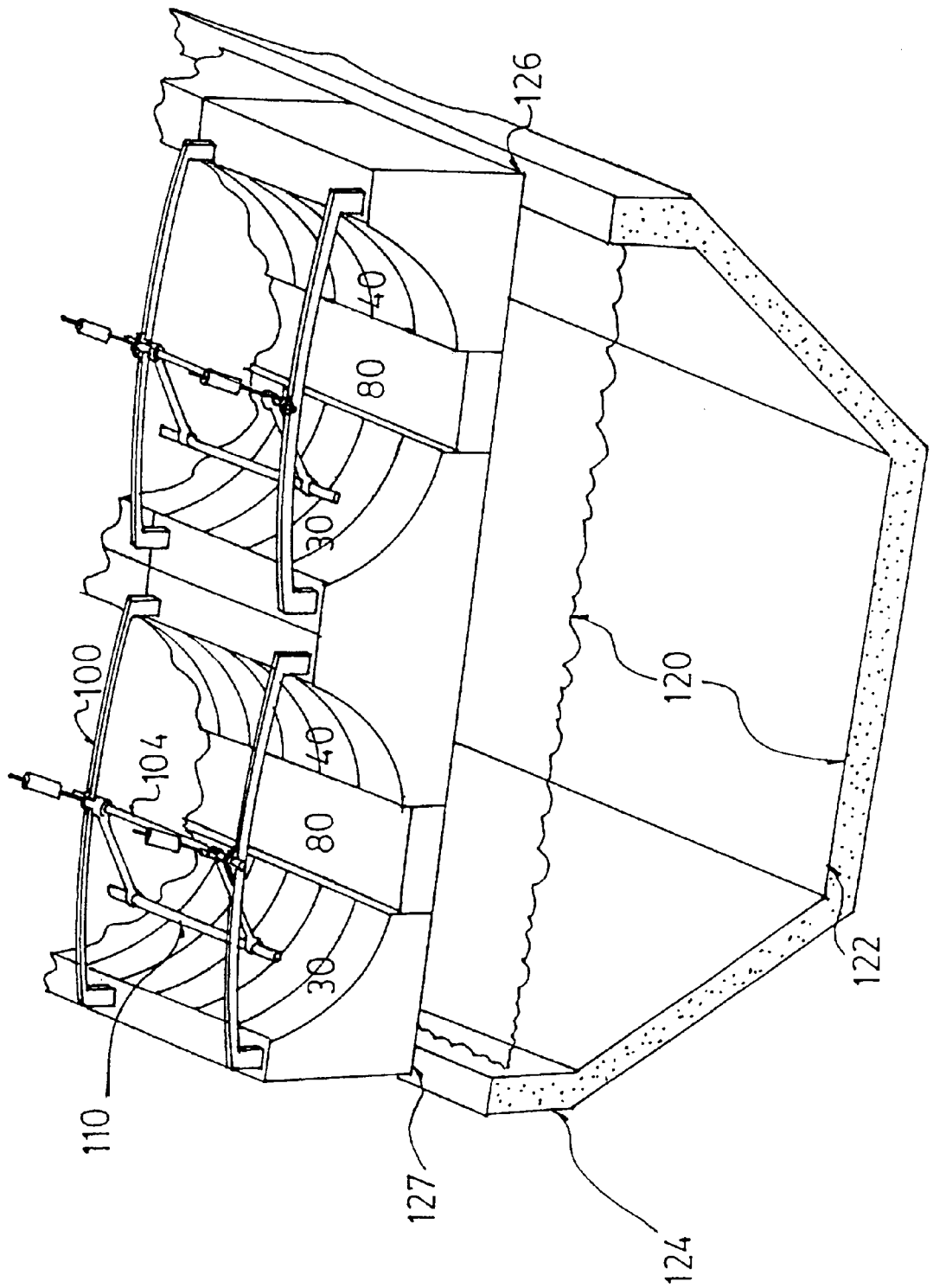
FIG. 16 is an isometric view of an embodiment of the present invention showing a parallel orientation of reflector panels to the underlying canal.
Figure 17:
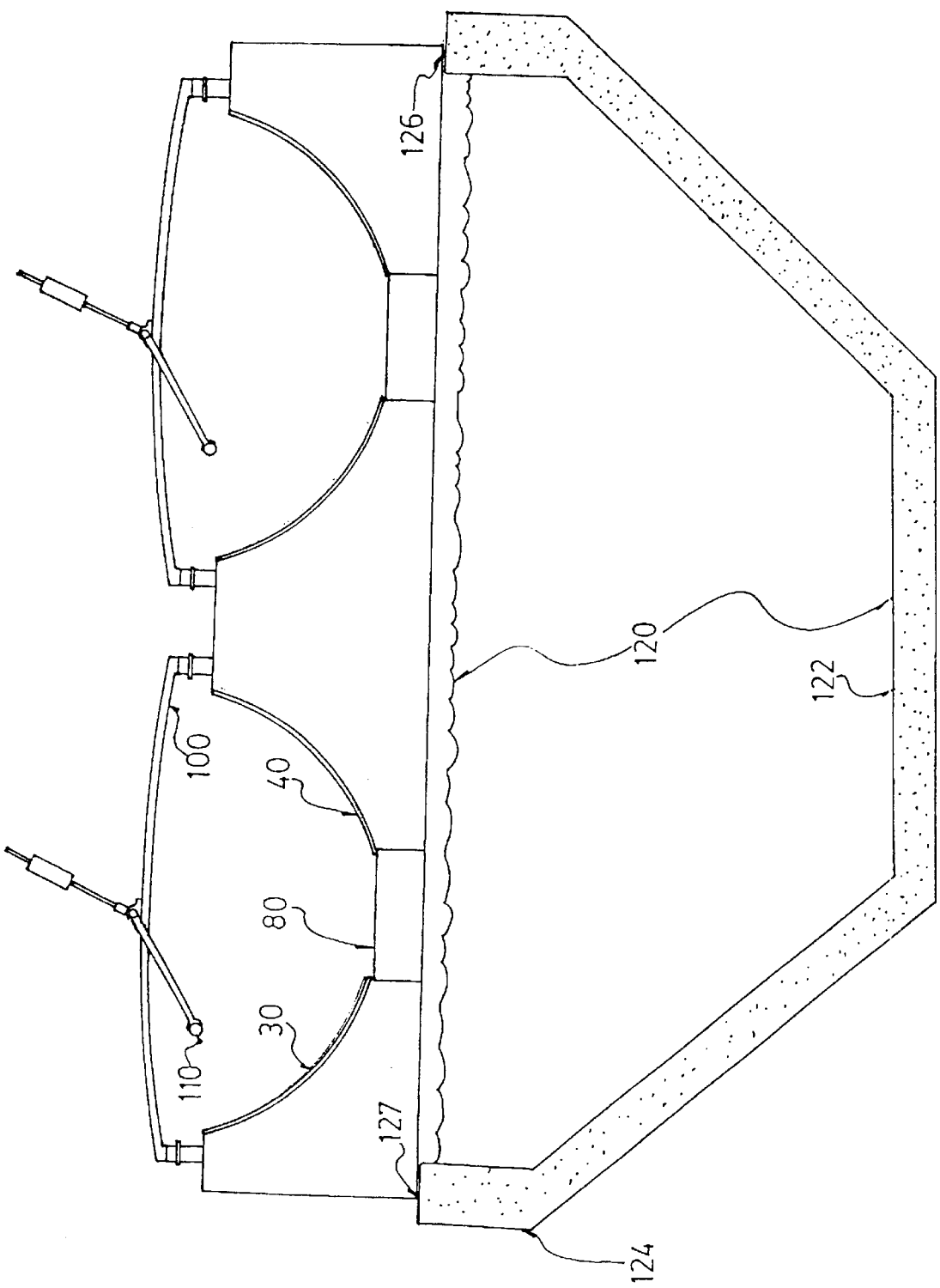
FIG. 17 is a sectional view of the embodiment in FIG. 16.
Figure 18:
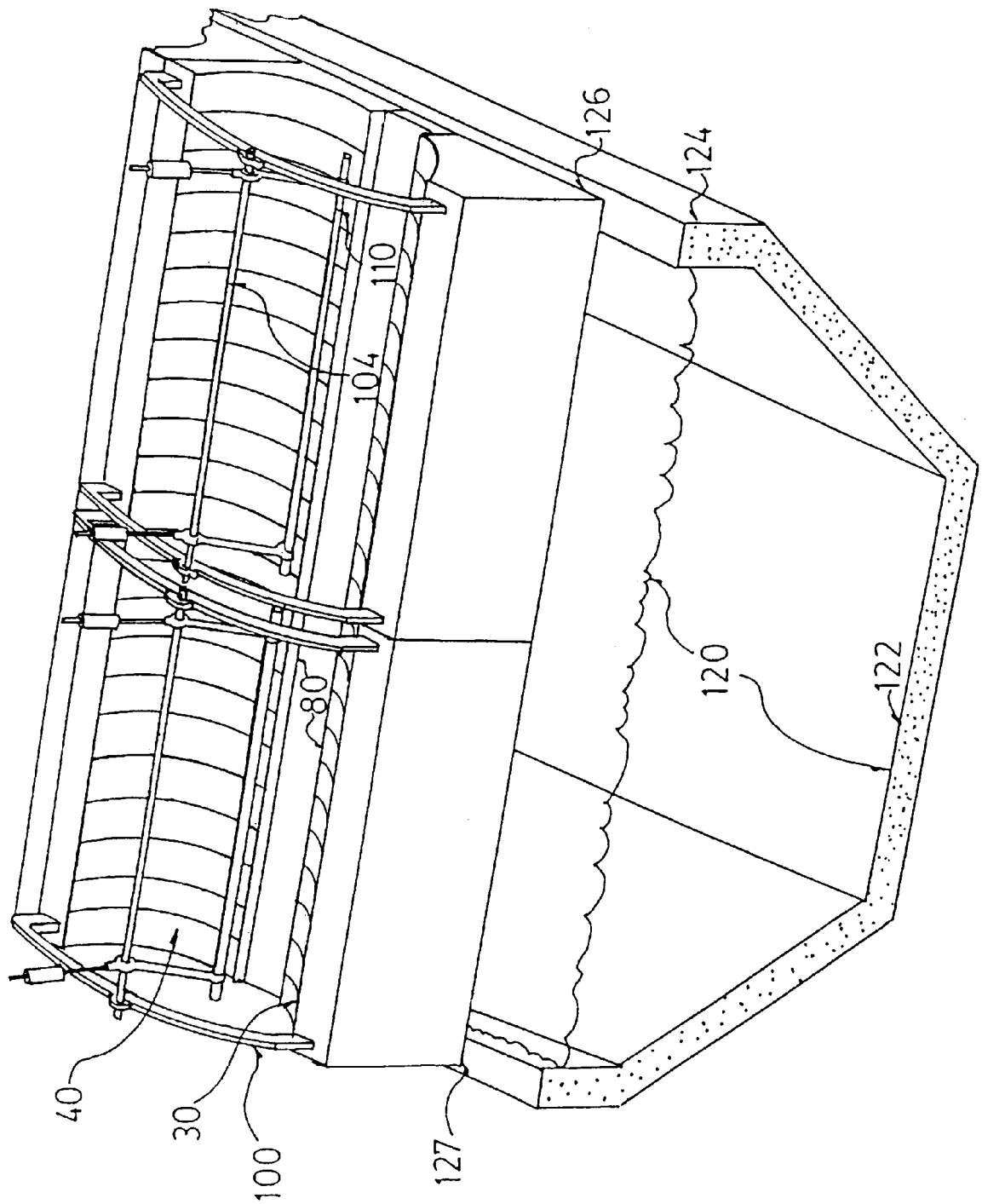
FIG. 18 is an isometric view of an embodiment of the present invention showing a perpendicular orientation of reflector panels to the underlying canal.
Figure 19:
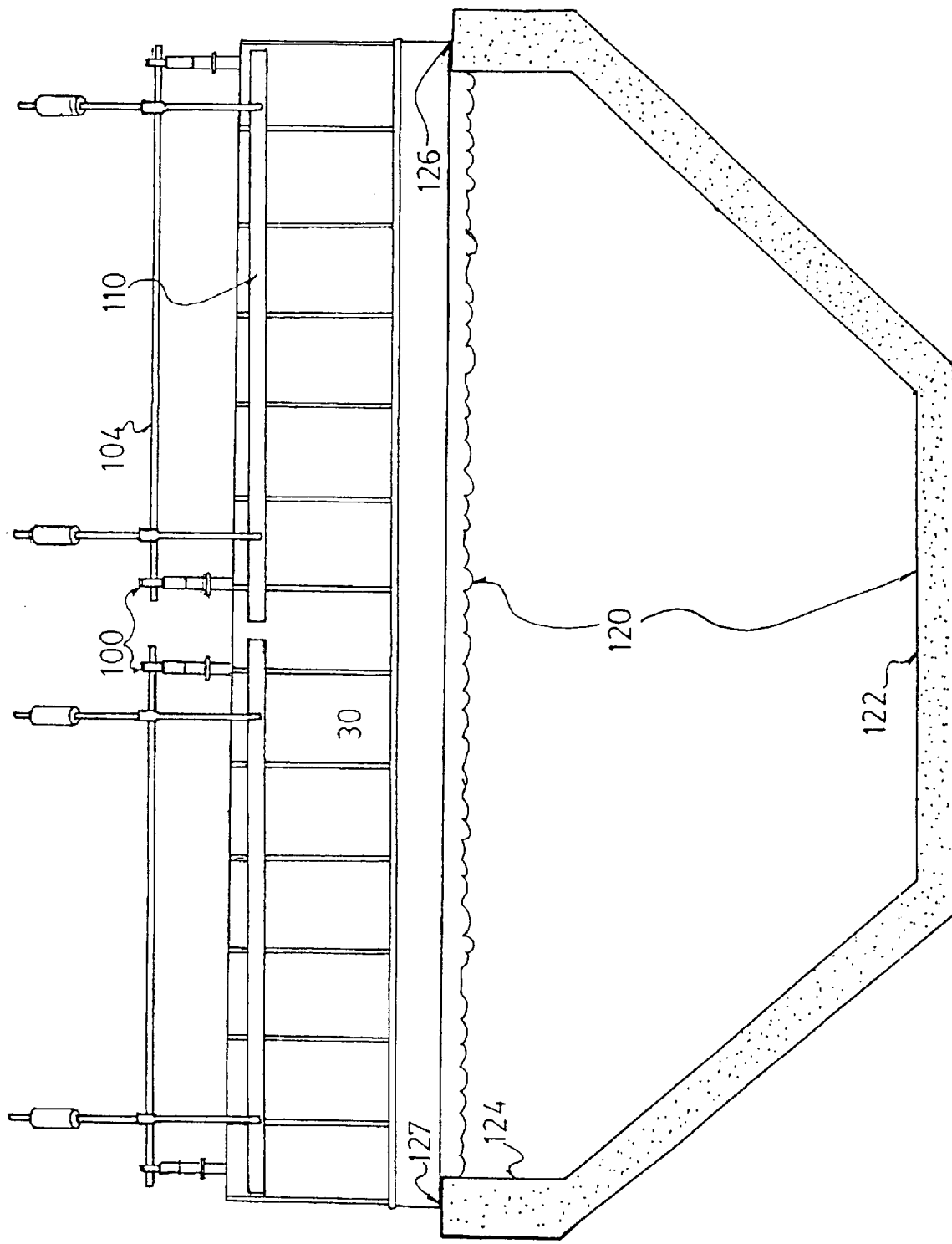
FIG. 19 is a sectional view of the embodiment in FIG. 18.

FIGS. 14 and 15 illustrates the variant of the double row reflector design that uses backing panels. One would prefer to orient the canal spanning members of the new structure such that the collector in the present invention is oriented in a lengthwise direction, i.e., follows the direction formed by the lower edge of the reflectors, which is within 30 degrees of a true North-South axis. However, the present invention can be used on other orientations. In this preferred embodiment, a plurality of flat trusses (11A and 11B) are used as the canal spanning member. Each flat truss is comprised of a plurality of web sections (12) disposed between an upper chord (13) and a lower chord (15). A plurality of transverse joist members (19) are connected to the lower chord. With such a flat truss, the upper panel support points (17) are located at or near the upper chord, and the lower panel support points (18) are located at or near the lower chord, the transverse joint members, or a combination thereof. The flat trusses are dimensioned and configured to support the weight of all of the supported elements described below, as well as conventional dead and live loads, such as wind and snow.

With the present improvement, a backing panel (20) underlies each solar energy concentrating reflector (30). This backing panel has a concave and cylindrically arcuate configuration of up to 90 degrees, a lower edge (22), an upper edge (24), and curved lateral edges (26). The backing panels are dimensioned and configured along the curved lateral edges such that one backing panel can be located laterally adjacent to another backing panel so as to form a row of backing panels extending for up to the length of the underlying space truss. In addition, the backing panel is made so as to provide dimensional or configurational stability to the overlying reflector. Suitable embodiments of the backing panel are described above.

A plurality of flexible solar energy concentrating reflector are used. Each reflector (30) is flexible enough to assume a concave and cylindrically arcuate configuration complementary to the underlying backing panel. Each reflector has a lower edge (32), an upper edge (34), and, when in place, curved lateral edges (36). The skyward surface of the reflector is the concave surface. Each reflector is dimensioned and configured along the lateral edges such that one reflector can be located adjacent to another reflector so as to form a row of reflectors extending for up to the length of the underlying space truss. Such a reflector can be comprised of a ultraviolet-stabilized plastic having a reflectorized concave surface as described above.

As part of the membrane means elements, the present invention includes a plurality of spanning member cap means (50). Also included is the end cap means (60), not shown in FIGS. 14 and 15. Both of these elements are as described in the Single Reflector Row section.

In order to keep leaks from occurring between adjacent backing panels or reflectors, the present invention includes a plurality of weatherweight panel sealing means. The panel sealing means (70), of conventional design, are located at various seams including at the lateral edges, the upper edge, and the lower edge of each backing panel.

A collector support means spans across and above the double row of reflectors as described in the Single Row Cover Embodiment section.

A reflected solar energy collector (110) is connected to the collector support means by lower support members. The collector has a compound parabolic design is located and operates, as described in the Single Row Cover Embodiment section.

A fluid transport system (not shown) connects the conduit of each collector to a thermal energy use means or an energy storage means. The fluid transport means circulates the solar energy-heated fluid.

Using Reflectors Without Backing Panels

In the second variant of the double row embodiment of the present invention, a plurality of reflectors is used as part of the membrane means, without the need for backing panels. The covered canal comprises a plurality of canal spanning members, as described above. A plurality of reflectors is used as part of the membrane means. Each reflector has a concave and cylindrically arcuate configuration of up to 90 degrees, a lower edge, an upper edge, and curved lateral edges. The reflectors are disposed adjacent to one another along the respective curved lateral edges to form a first row and a second row between adjacent canal spanning members covering the entire length of the canal spanning members. The first row and the second row are disposed such that the lower edges of the reflectors in the first row are adjacent to the lower edges of the reflectors. At least one of the curved lateral edges of at least one reflector disposed in each row attaches either to the upper panel support points of the underlying canal spanning member, to the lower panel support points of the underlying canal spanning member, or to a combination of the above. One of ordinary skill in the art can vary the support points allowed through changing the strength of the reflector. Thus, each reflector need not be attached to support points. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying canal spanning member so as to form each row of adjacent reflectors. One of ordinary skill in the art can use various materials to construct such a reflector, including fabricated metals or alloys with polished or reflectorized surfaces, and molded laminates or composites with reflectorized surfaces.

As part of the membrane means elements that form a weatherweight seal, the present invention includes a plurality of spanning member cap means, a plurality of end cap means, and a plurality of weathertight panel sealing means, all as described above.

In addition to the structural means and the membrane means, the present invention also comprises elements necessary to gather the reflected solar energy from the reflector. These solar energy gathering elements are the same as described above in the first variant of the single row embodiment.

Additional Features

Figure 2:
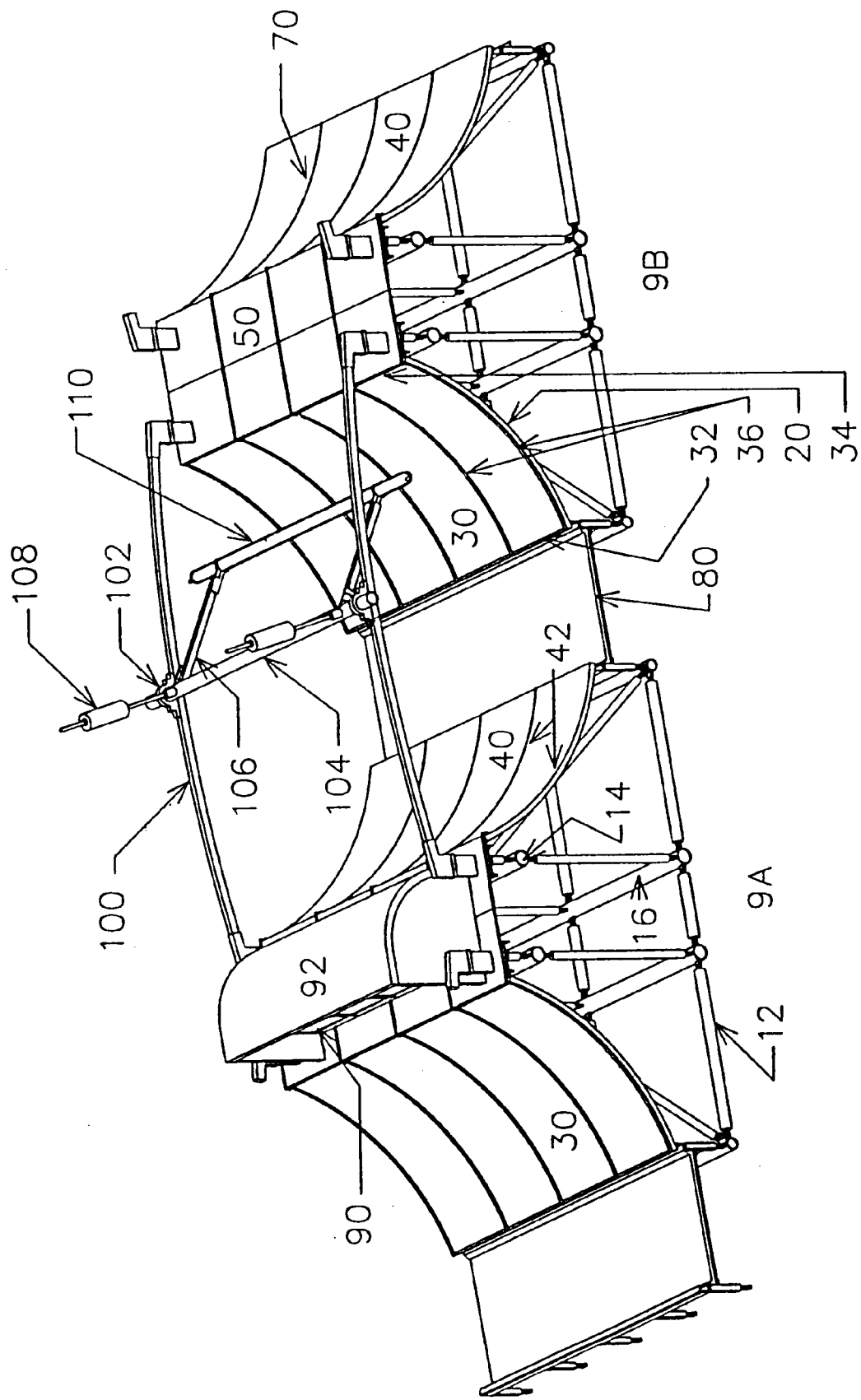
FIG. 2 is an isometric view of the embodiment of FIG. 1.
Figure 3:
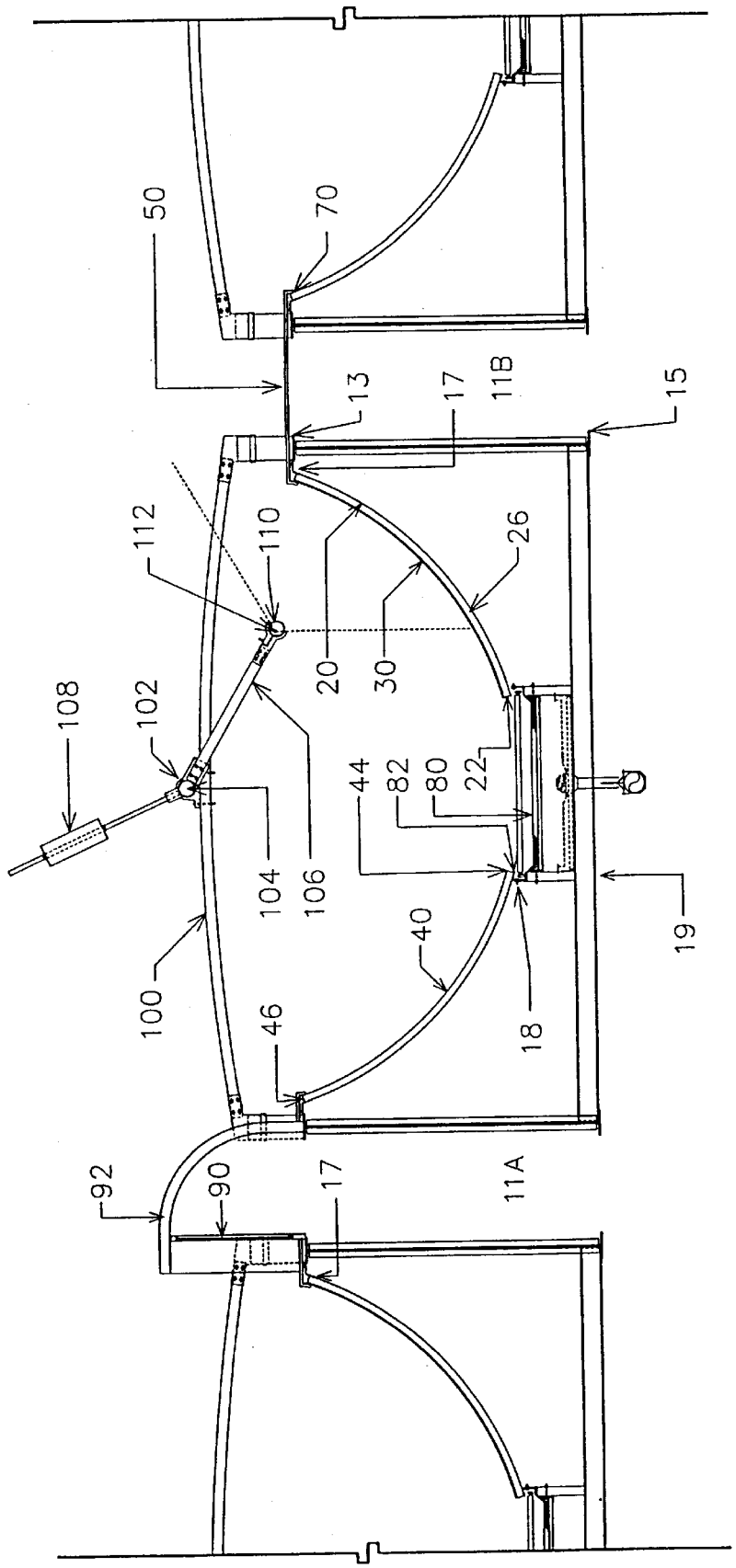
FIG. 3 is a sectional view of an embodiment of the present invention using a flat truss, a single row of reflectors, and a single row of non-reflective roofing panels.
Figure 4:
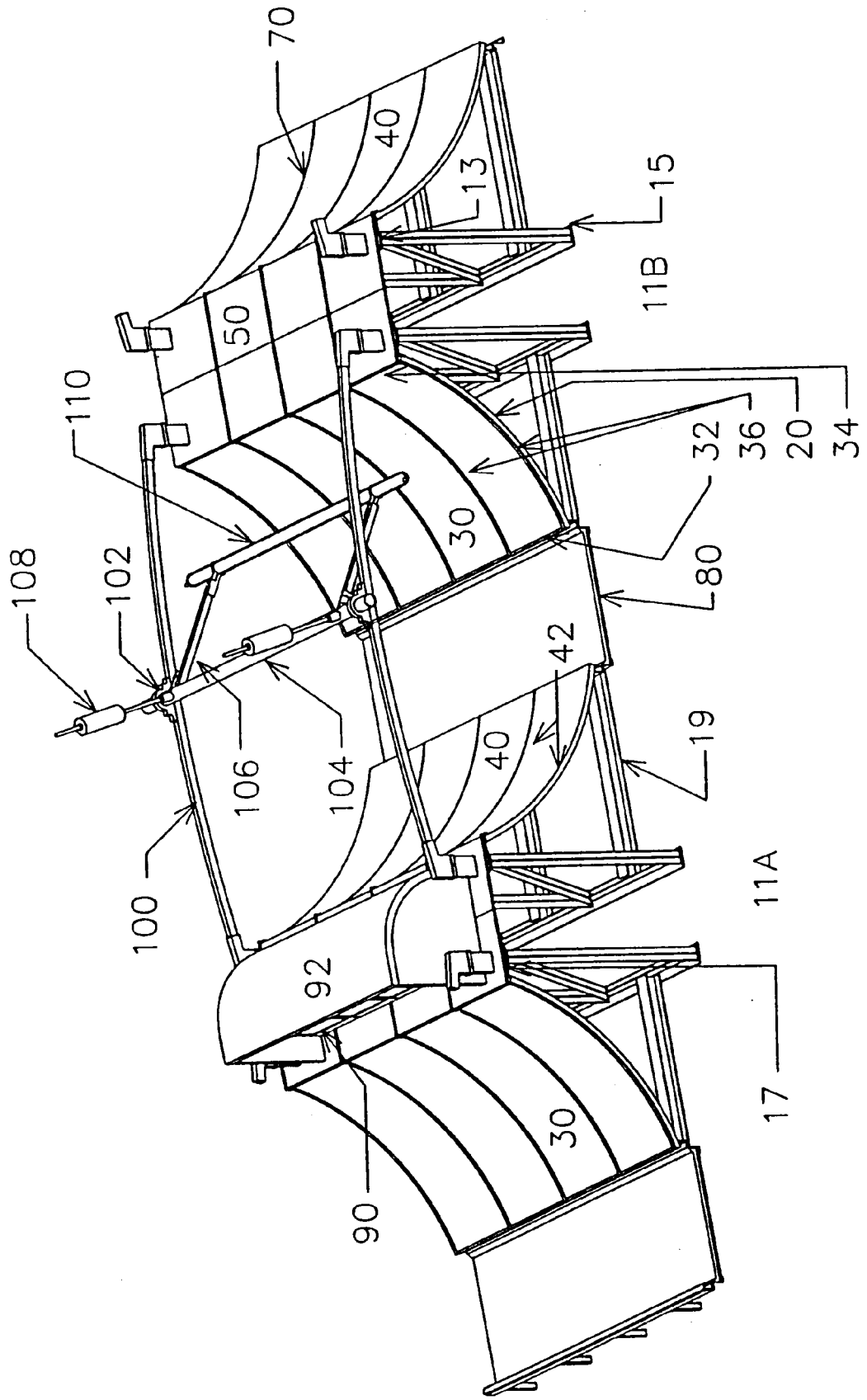
FIG. 4 is an isometric view of the embodiment in FIG. 3.

Preferred embodiments of the present invention, whether of the single row embodiment or the double row embodiment can include a number of additional features. For example, when selecting a truss for the canal spanning member, as one would if spanning greater than 24 feet and not desiring supporting uprights between the ends of the canal spanning member, one can choose between a space truss or a flat truss to be used in the present invention. With a simple space truss (10), one can use a triangular design, as shown in FIGS. 5, 6, 9, 11, 12, and 13, a complex space truss (9) as shown in FIGS. 1 and 2, or a flat truss (11), as shown in FIGS. 3, 4, 7, 8, 14, and 15.

In all embodiments using backing panels, the reflectors/photo-voltaic panels and the underlying backing panels can be dimensioned and configured such that each reflector may be detached without removing the underlying backing panel and without affecting the weathertight panel sealing means. Such a configuration allows for the easy replacement of reflectors without disturbing the non-evaporative integrity of the cover about the canal.

Another preferred feature for the present invention is to provide for gutter means at the lower edges of the reflectors. Three benefits can arise from this practice. First, the gutter means remove debris from settling on the reflector surface, maintaining a high reflectivity, and thus, energy yield for the solar energy concentrating components. Second, the gutter can be designed to be wide enough and strong enough to support a person, maintenance equipment, and the like. Thus, maintenance can be performed on the membrane means without having to step on the reflectors, thereby preventing damage to the reflective surfaces. Three, the gutter can be designed to capture any precipitation and direct it into the canal. The present cover can have a plurality of gutter means, each gutter means (80) being located between adjacent canal spanning members, as shown in FIGS. 1 to 11 and 14 to 15. Each gutter means extends the length of the canal spanning members and is located below the lower edges of the row of adjacent reflectors. The gutter means are connected either to the underlying canal spanning member, the lower panel support points, the adjacent reflectors, the adjacent backing panels or a combination thereof. To maintain the non-evaporative integrity of the present cover, a plurality of weathertight gutter sealing means is included with the gutter means. Each gutter sealing means (82) is disposed between each gutter means and the gutter seams which include the lower edges of the adjacent backing panels, the lower edges of the adjacent reflectors, or a combination thereof. Such sealing means are of conventional design and are known to those of skill in the art.

To enhance the utility of the present invention, insulation means can be provided for the various membrane means components. Thus, the backing panels, reflectors, end cap means, spanning member cap means, and gutter means can have an insulating means disposed beneath or attached to these elements or incorporated into these elements gutter means.

A further enhancement can come from the use of drip rails. Placed on the underside of the membrane means, drip rails would direct any canal water condensate back into the canal, instead of running down the underside and falling onto the canal side aprons.

Another preferred feature for the present invention is to use daylighting means in the cover so as to provide ambient lighting for the inspection of the canal. A daylighting means can be made of either a transparent or translucent material. One way of providing daylighting comprises the spanning member cap means being dimensioned and configured such that at least one daylighting means is located on a surface of the spanning member cap means. In other words, flat glass panels can be inset into the spanning cap means, not shown. A second way is to use a raised transparent or substantially translucent daylighting panel (90), as shown in FIGS. 1 to 4. Such a panel is disposed substantially vertically from the surface of the spanning member cap means. A daylighting panel housing (92) is attached to the spanning member cap means, said housing being dimensioned and configured to form a weathertight seal between the raised daylighting panel and the spanning member cap means. A third way of daylighting is to use a transparent or substantially translucent daylighting panel (94) in place of a reflector, or if used, the reflector and the underlying backing panel, as shown in FIG. 14. This daylighting panel would be dimensioned and configured so as to form a weathertight seal with adjacent panel seams such as either an adjacent daylighting means, an adjacent reflector, an adjacent backing panel, or a combination thereof. A fourth way to provide daylighting can be used in the preferred single reflector row embodiments. Here, one or more of the non-reflective roofing panels can be substituted for with a transparent or translucent replacement daylighting panel (94), also shown in FIG. 3. Any combination of the above, in the appropriate covered canal embodiments, can be used to provide a desired level of daylighting.

Another feature suitable for the present invention is to provide for the weathertight panel sealing means to be integrated into the reflectors, photo-voltaic panels, the backing panels, the non-reflective roofing panels, or the replacement daylighting panels by designing the edges of these membrane means elements to have an interlocking means that does not allow water to penetrate between such adjacent membrane means elements.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. A canal system having reduced evaporative loss comprising:
   a) a canal for the transport of water having:
      i) a bottom surface;
      ii) a first side wall attached to the bottom surface and extending upwards; and
      iii) a second side wall attached to the bottom surface opposite the first side wall and extending upwards, the first and second side walls being attached to the bottom surface and extending longitudinally so as to form the canal;
   b) a first load-bearing member disposed about the first side wall of the canal;
   c) a second load-bearing member disposed about the second side wall of the canal;
   d) a structural support means that extends above and across the upper surface of the water which is supported by the first and second load-bearing members, said structural support means being dimensioned and configured to support the weight of at least a membrane means, a solar energy primary concentrating reflector, a compound parabolic secondary solar energy collector, and a collector support means;
   e) a membrane means that covers the structural support means so as to form a substantially air tight relationship between the upper surface of the water and the ambient weather about the canal;
   f) a primary reflector means comprising at least one solar energy primary concentrating reflector having a concave and cylindrically arcuate configuration of up to about 220 degrees, a lower edge, an upper edge, and curved lateral edges, the skyward surface of the reflector being the concave surface, which is disposed above the structural support;
   g) a collector support means spanning across and above the reflector, said collector support means being connected to a solar energy collector and either to the structural support means or to a supporting surface that underlies the structural support means, and said collector support means being dimensioned and configured so as to support the solar energy collector and allow it to move arcuately;
   h) a secondary collector means comprising a linear secondary solar energy collector having a compound parabolic cross-section, said collector extending laterally across the reflector, said collector being located and disposed so as to move arcuately within a predetermined focal zone for collecting reflected solar energy from the reflector, and said collector being dimensioned and configured to receive the reflected solar energy into a conduit through which an energy transfer fluid flows, said fluid being heated by the reflected solar energy;
   i) a means for positioning the collector in an optimal position within the focal collection zone throughout a defined solar cycle, said positioning means being connected to the collector support means; and
   j) a fluid transport means which connects the conduit of the collector to a thermal energy use means or an energy storage means, wherein the fluid transport means circulates the solar energy-heated fluid through the conduit.

2. The canal system of claim 1 wherein the positioning means is controlled by a microprocessor which periodically calculates an optimal position within the focal collection zone for the collector to receive the reflected solar energy from the reflector.

3. The canal system of claim 1 wherein the collector is oriented lengthwise within 30 degrees of a true East-West axis.

4. The canal system of claim 1 comprising two reflectors, wherein a first reflector is adjacent along the entire lower edge to the lower edge of a second reflector, each reflector having a cylindrically arcuate configuration of up to about 110 degrees.

5. The canal system of claim 4 wherein the collector is oriented lengthwise within 30 degrees of a true North-South axis.

6. The canal system of claim 1 wherein the collector support means includes at least two collector support members, each being disposed at either end of the collector.

7. The canal system of claim 1 wherein:
   a) the structural support means further comprises a plurality of canal spanning members, a plurality of first load-bearing members, and a plurality of second load-bearing members, each canal spanning member spanning from a first load-bearing member to a second load-bearing member, each canal spanning member being separated from an adjacent canal spanning member or an outside wall of an elevated cover by a distance at least sufficient to allow a backing panel or a solar energy concentrating reflector to be disposed within that distance, each canal spanning member having a plurality of underlying reflector support point means, and each canal spanning member being dimensioned and configured to support the weight of all of the supported elements in paragraphs b) to g), as well as conventional dead loads and live loads;
   b) the membrane means comprises:
      i) a plurality of backing panels, each backing panel having a concave and cylindrically arcuate configuration of up to 180 degrees, a lower edge, an upper edge, and lateral edges, wherein at least one of the lateral edges of at least one backing panel, disposed in a row of adjacent backing panels, attaches to at least one underlying panel support means, each backing panel being disposed such that the skyward surface of each backing panel is the concave surface, and each backing panel being dimensioned and configured along the lateral edges wherein the lateral edge of a backing panel can be placed adjacent along the lateral edge of another backing panel extending for up to the length of the underlying canal spanning member so as to form the row of adjacent backing panels;

ii) a plurality of spanning member cap means, each spanning member cap means being connected to an underlying cap support means, each spanning member cap means extending lengthwise for the length of the canal spanning member and extending laterally across the canal spanning member, wherein each spanning member cap means is dimensioned and configured so as to form a weathertight seal with the backing panels and the canal spanning member;

iii) a plurality of end cap means, each end cap means being connected to otherwise exposed structural support means and membrane means elements, each end cap means being dimensioned and configured so as to form a tight seal with the membrane means elements to which the end cap means is connected; and iv) a plurality of weathertight panel sealing means, said panel sealing means being located at the panel seams;

c) the primary reflector means comprises a plurality of solar energy concentrating reflectors, each reflector having a skyward facing surface that reflects radiant solar energy, each reflector having an upper edge, a lower edge, and lateral edges, and each reflector being disposed on top of the skyward surface of an underlying backing panel;

d) the collector support means comprises a plurality of collector support means, each collector support means being disposed above each row of adjacent reflectors, wherein each collector support means comprises a plurality of collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first canal spanning member and second canal spanning member so as to allow a reflected solar energy collector to move within predetermined focal zone for collecting reflected solar energy from the underlying reflectors, said collector support members being dimensioned and configured so as to support said collector;

e) the secondary collector means comprises a plurality of linear secondary solar energy collectors, each collector extending lengthwise across a row of adjacent reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

f) the collector positioning means locates each collector in an optimal position within the focal collection zone for each collector throughout a defined solar cycle, said positioning means being connected to each collector support means; and g) the fluid transport means connects each conduit to a thermal energy use means or an energy storage means, wherein the fluid transport means circulates the solar energy-heated fluid through the plurality of conduits.

8. The canal system of claim 7 wherein each canal spanning member comprises a space truss selected from the group consisting of a simple space truss, said space truss having a plurality of web sections connecting at least one upper chord to at least two lower chords wherein the upper panel support points are located near the upper chord and the lower panel support points are located near the lower chords.

9. The canal system of claim 7 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord and the transverse joint members.

10. The canal system of claim 7 wherein the reflectors are dimensioned and configured such that each reflector may be detached, removed, and replaced individually.

11. The canal system of claim 7 also comprising:
a) a plurality of gutter means, each gutter means being located between adjacent canal spanning members, each gutter means extending the length of the canal spanning members and being located below the lower edges of the row of adjacent reflectors, said gutter means being connected to an underlying gutter support means; and
b) a plurality of weathertight gutter sealing means, each gutter sealing means being disposed between each gutter means and the gutter seams.

12. The canal system of claim 11 wherein the gutter means has an insulating means disposed beneath the gutter means.

13. The canal system of claim 12 wherein the backing panels, the end cap means, and the spanning member cap means each have an insulating means disposed beneath.

14. The canal system of claim 7 wherein the backing panels, the end cap means, and the spanning member cap means each having an insulating means disposed beneath.

15. The canal system of claim 7 wherein weathertight panel sealing means are integrated into the panels seams.

16. The canal system of claim 7 wherein each collector is oriented lengthwise within 30 degrees of a true East-West axis.

17. The canal system of claim 7 wherein the spanning member cap means are dimensioned and configured such that at least one daylighting means is located on a surface of the spanning member cap means.

18. The canal system of claim 7 having at least one reflector and the underlying backing panel replaced by a non-reflective roofing panel, said non-reflective roofing panel being dimensioned and configured to form a weathertight seal with adjacent panel seams.

19. The canal system of claim 18 having at least one reflector and the underlying backing panel or at least one non-reflective roofing panel replaced by a transparent or substantially translucent daylighting panel, said daylighting panel being dimensioned and configured to form a weathertight seal with adjacent panel seams.

20. The canal system of claim 1 wherein
a) the structural support means comprises a plurality of canal spanning members, a plurality of first load-bearing members, and a plurality of second load-bearing members, each canal spanning member spanning from a first load-bearing building member to a second load-bearing building, each canal spanning member being separated from an adjacent canal spanning member or an outside wall of the covered structure by a distance at least sufficient to allow a solar energy concentrating reflector to be disposed within that distance, each canal spanning member having a plurality of underlying panel support means, and each canal spanning member being dimensioned and configured to support the weight of all of the supported elements in paragraphs b) to f), as well as conventional dead loads and live loads;

b) the membrane means comprises:
   i) the primary reflector means wherein a plurality of solar energy concentrating reflectors, each reflector having a concave and cylindrically arcuate configuration of up to 180 degrees, a lower edge, an upper edge, and lateral edges, wherein the upper edge or the upper portion of at least one of the lateral edges of at least one reflector, disposed in a row of adjacent reflectors, attaches to the upper panel support points of the underlying canal spanning member, the lower edge or the lower portion of at least one of the lateral edges of each reflector attaching to the lower panel support points of the underlying canal spanning member, or a combination of such upper panel support points and lower panel support points, each reflector being disposed such that the skyward surface of each reflector is the concave surface, each reflector having skyward facing surface that reflects radiant solar energy, and each reflector being dimensioned and configured along the lateral edges wherein the lateral edge of a reflector can be placed adjacent along the lateral edge of another reflector extending for up to the length of the underlying canal spanning member so as to form the row of adjacent reflectors;
   ii) a plurality of spanning member cap means, each spanning member cap means being connected to an underlying cap support means, each spanning member cap means extending lengthwise for the length of the canal spanning member and extending laterally across the canal spanning member, wherein each spanning member cap means is dimensioned and configured so as to form a weathertight seal with the reflectors and the canal spanning member;
   iii) a plurality of end cap means, each end cap means being connected to otherwise exposed structural support means and membrane means, each end cap means being dimensioned and configured so as to form a weathertight seal with the membrane means elements to which the end cap means is connected; and
   iv) a plurality of weathertight panel sealing means, said panel sealing means being located at the panel seams;

c) the collector support means comprises a plurality of collector support means, each collector support means being disposed above each row of adjacent reflectors, wherein each collector support means comprises a plurality of collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first spanning member and second spanning member so as to allow each reflected solar energy collector to move within a predetermined focal zone for collecting reflected solar energy from the underlying reflectors, said collector support members being dimensioned and configured so as to support said collector;

d) the primary reflector means comprises a plurality of reflected solar energy collectors, each collector extending lengthwise across a row of adjacent reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

e) the collector positioning means locates each collector in an optimal position within the focal collection zone throughout a defined solar cycle for each collector, said positioning means being connected to each collector support means; and f) the fluid transport means connects each conduit to a thermal energy use means or an energy storage means, wherein the fluid transport means circulates the solar energy-heated fluid through the plurality of conduits.

21. The canal system of claim 20 wherein each canal spanning member comprises a space truss, each space truss having a plurality of web sections connecting at least one upper chord to at least two lower chords wherein the upper panel support points are located near the upper chord and the lower panel support points are located near the lower chords.

22. The canal system of claim 20 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord and the transverse joint members.

23. The canal system of claim 20 wherein the reflectors are dimensioned and configured such that each reflector may be detached, removed, and replaced individually.

24. The canal system of claim 20 also comprising:
   a) a plurality of gutter means, each gutter means being located between adjacent canal spanning members, each gutter means extending the length of the canal spanning members and being located below the lower edges of the adjacent reflectors, said gutter means being connected to an underlying gutter support means; and
   b) a plurality of weathertight gutter sealing means, each gutter sealing means being disposed between each gutter means and the gutter seams.

25. The canal system of claim 20 wherein weathertight panel sealing means are integrated into the lateral edges, the upper edge, and the lower edge of each reflector.

26. The canal system of claim 20 wherein each collector is oriented lengthwise within 30 degrees of a true East-West axis.

27. The canal system of claim 20 wherein the spanning member cap means are dimensioned and configured such that at least one daylighting means is located on a surface of the spanning member cap means.

28. The canal system of claim 20 having at least one daylighting means, wherein each daylighting means comprises:

a) a raised transparent or substantially translucent daylighting panel disposed substantially vertically from the surface of the spanning member cap means; and b) a daylighting panel housing attached to the spanning member cap means, said housing being dimensioned and configured to form a weathertight seal between the raised daylighting panel and the spanning member cap means.

29. The canal system of claim 20 having at least one reflector replaced by a daylighting panel, said daylighting panel being dimensioned and configured to form a weathertight seal with adjacent panel.

30. The canal system of claim 20 having at least one reflector replaced by a non-reflective roofing panel, said non-reflective roofing panel being dimensioned and configured to form a weathertight seal with adjacent panel seams.

31. The canal system of claim 30 having at least one reflector or at least one non-reflective roofing panel replaced by a daylighting panel, said daylighting panel being dimensioned and configured to form a weathertight seal with adjacent panel seams.

32. The canal system of claim 1 wherein:

a) the structural support means comprises a plurality of canal spanning members, a plurality of first load-bearing members, a plurality of second load-bearing members, each canal spanning member spanning from a first load-bearing building member to a second load-bearing building, each canal spanning member being separated from an adjacent canal spanning member or an outside wall of the covered structure by a distance at least sufficient to allow a backing panel or a solar energy concentrating reflector to be disposed within that distance, each canal spanning member having a plurality of underlying panel support means, and each canal spanning member being dimensioned and configured to support the weight of all of the supported elements in paragraphs b) to g), as well as conventional dead loads and live loads;

b) the membrane means comprises:

i) a plurality of backing panels, each backing panel having a concave and cylindrically arcuate configuration of up to about 120 degrees, a lower edge, an upper edge, and lateral edges, wherein at least one of the lateral edges of at least one backing panel, disposed in a row of adjacent backing panels, attaches to at least one underlying panel support means, each backing panel being disposed such that the skyward surface of the backing panel is the concave surface, and each backing panel being dimensioned and configured along the lateral edges wherein the lateral edge of a backing panel can be placed adjacent along the lateral edge of another backing panel extending for up to the length of the underlying canal spanning member so as to form the row of adjacent backing panels;

ii) a plurality of non-reflective roofing panels, each non-reflective roofing panel having lateral edges, a lower edge which attaches either to the lower edge of an adjacent backing panel or to a lower panel support point, and an upper edge which attaches to the top of a canal spanning member adjacent to the canal spanning member supporting the upper edge of the adjacent backing panel, said canal spanning member being closest to the lower edge of the backing panel, or attaches to an upper panel support point on said adjacent canal spanning member, each non-reflective roofing panel being dimensioned and configured along the lateral edges wherein the lateral edge of a non-reflective roofing panel can be placed adjacent to the lateral edge of another non-reflective roofing panel for the length of the underlying canal spanning member so as to form a row of adjacent non-reflective roofing panels;

iii) a plurality of spanning member cap means, each spanning member cap means being connected to an underlying cap support, each spanning member cap means extending lengthwise for the length of the canal spanning member and extending laterally across the canal spanning member, wherein each spanning member cap means is dimensioned and configured so as to form a weathertight seal with the backing panels and the canal spanning member;

iv) a plurality of end cap means, each end cap means being connected to otherwise exposed structural support means and membrane means, each end cap means being dimensioned and configured so as to form a tight seal with the membrane means elements to which the end cap means is connected; and v) a plurality of weathertight panel sealing means, said panel sealing means being located at panel seams;

c) the primary reflector means comprises a plurality of solar energy concentrating reflectors, each reflector having a skyward surface that reflects radiant solar energy, each reflector having an upper edge, a lower edge, and lateral edges, and each reflector being disposed on top of the skyward surface of an underlying backing panel;

d) the collector support means comprises a plurality of collector support means, each collector support means being disposed above each row of adjacent reflectors, wherein each collector support means comprises a plurality of collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first spanning member and second spanning member so as to allow each reflected energy solar collector to move within a predetermined focal zone for collecting reflected solar energy from the underlying reflectors, said collector support members being dimensioned and configured so to support said collector, e) the secondary collector means comprises a plurality of reflected solar energy collectors, each collector extending lengthwise over a row of adjacent reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

f) the collector positioning means locates each collector in an optimal position within the focal collection zone for each collector throughout a defined solar cycle, said positioning means being connected to each collector support means; and g) the fluid transport means connects each conduit to a thermal energy use means or an energy storage means, wherein the fluid transport means circulates the solar energy-heated fluid through the plurality of conduits.

33. The canal system of claim 32 wherein each canal spanning member comprises a space truss, each space truss having a plurality of web sections connecting at least one upper chord to at least two lower chords wherein the upper panel support points are located near the upper chord and the lower panel support points are located near the lower chords.

34. The canal system of claim 32 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord and the transverse joint members.

35. The canal system of claim 32 wherein the reflectors are dimensioned and configured such that each reflector may be detached, removed, and replaced individually.

36. The canal system of claim 32 also comprising:
a) a plurality of gutter means, each gutter means being located between adjacent canal spanning members, each gutter means extending the length of the canal spanning members and being located below the lower edges of the adjacent reflectors, said gutter means being connected to an underlying gutter support; and
b) a plurality of weathertight gutter sealing means, each gutter sealing means being disposed between each gutter means and the gutter seams.

37. The canal system of claim 36 wherein the gutter means has an insulating means disposed beneath the gutter means.

38. The canal system of claim 37 wherein the backing panels, the end cap means, and the spanning member cap means have an insulating means disposed beneath.

39. The canal system of claim 32 wherein the backing panels, the end cap means, and the spanning member cap means have an insulating means disposed beneath.

40. The canal system of claim 32 wherein weathertight panel sealing means are integrated into the panel seams.

41. The canal system of claim 32 wherein each collector is oriented lengthwise within 30 degrees of a true East-West axis.

42. The canal system of claim 32 wherein the spanning member cap means are dimensioned and configured such that at least one daylighting means is located on a surface of the spanning member cap means.

43. The canal system of claim 32 having at least one daylighting means, wherein each daylighting means comprises:
a) a raised daylighting panel disposed substantially vertically from the surface of the spanning member cap means; and
b) a daylighting panel housing attached to the spanning member cap means, said housing being dimensioned and configured to form a weathertight seal between the raised daylighting panel and the spanning member cap means.

44. The canal system of claim 32 having at least one daylighting means, wherein said daylighting means comprises a daylighting panel disposed in place of a reflector and the underlying backing panel or a non-reflective roofing panel, said daylighting panel being dimensioned and configured to form a weathertight seal with adjacent panel seams.

45. The canal system of claim 32 wherein the non-reflective roofing panels are transmit light.

46. The canal system of claim 32 wherein the non-reflective roofing panels are substantially planar.

47. The canal system of claim 32 wherein the non-reflective roofing panels are disposed in a substantially vertical orientation.

48. The canal system of claim 1 wherein:
a) the structural support means comprises a plurality of canal spanning members, a plurality of first load-bearing members, a plurality of second load-bearing members, each canal spanning member spanning from a first load-bearing building member to a second load-bearing building, each canal spanning member being separated from an adjacent canal spanning member or an outside wall of the covered structure by a distance at least sufficient to allow a backing panel or a solar energy concentrating reflector to be disposed within that distance, each canal spanning member having a plurality of underlying panel support means, and each canal spanning member being dimensioned and configured to support the weight of all of the supported elements in paragraphs b) to f), as well as conventional dead loads and live loads;
b) the membrane means comprises:
i) the primary reflector means wherein a plurality of solar energy concentrating reflectors, each reflector having a concave and cylindrically arcuate configuration of up to about 120 degrees, a lower edge, an upper edge, and lateral edges, wherein the at least one of the lateral edges of at least one reflector, disposed in a row of adjacent reflectors, attaches to the underlying panel support means, each reflector being disposed such that the skyward surface of each reflector is the concave surface, and each reflector having a skyward facing surface that reflects radiant solar energy, and each reflector being dimensioned and configured along the lateral edges wherein the lateral edge of a reflector can be placed adjacent along the lateral edge of another reflector extending for up to the length of the underlying canal spanning member so as to form the row of adjacent reflectors;
ii) a plurality of non-reflective roofing panels, each non-reflective roofing panel having lateral edges, a lower edge which attaches to the lower edge of an adjacent reflector or a lower panel support point, and an upper edge which attaches either to the top of a canal spanning member adjacent to the canal spanning member supporting the upper edge of the reflector, said adjacent canal spanning member being closest to the lower edge of the reflector or attaches to upper panel support points on said adjacent canal spanning member, each non-reflective roofing panel being dimensioned and configured along the lateral edges herein the lateral edge of a non-reflective roofing panel can be placed adjacent to the lateral edge of another non-reflective roofing panel extending for up to the length of the underlying canal spanning member so as to form a row of adjacent non-reflective roofing panels;
iii) a plurality of spanning member cap means, each spanning member cap means being connected to an underlying cap support, each spanning member cap means extending for the length of the canal spanning member and extending laterally across the canal spanning member, wherein each spanning member cap means is dimensioned and configured so as to form a weathertight seal with the reflectors and the canal spanning member;
iv) a plurality of end cap means, each end cap means being connected to otherwise exposed structural support means and membrane means elements, each end cap means being dimensioned and configured so as to form a weathertight seal with the membrane means elements to which the end cap means is connected; and v) a plurality of weathertight panel sealing means, said panel sealing means being located at the panel seams;

c) the collector support means comprises a plurality of collector support means, each collector support means being disposed above each row of adjacent reflectors, wherein each collector support means comprises a plurality of collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first canal spanning member and second canal spanning member so as to allow each reflected solar energy collector to move within a predetermined focal zone for collecting reflected solar energy from the underlying reflectors, said collector support members being dimensioned and configured so to support said collector;

d) the secondary collector means comprises a plurality of reflected solar energy collectors, each collector extending lengthwise over a plurality of adjacent reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

e) the collector positioning means locates each collector in an optimal position within the focal collection zone for each collector throughout a defined solar cycle, said positioning means being connected to each collector support means; and f) the fluid transport means connects each conduit to a thermal energy use means or a solar energy storage means, wherein the fluid transport means circulates the solar-energy heated fluid through the plurality of conduits.

49. The canal system of claim 48 wherein each canal spanning member comprises a space truss, each space truss having a plurality of web sections connecting at least one upper chord to at least two lower chords wherein the upper panel support points are located near the upper chord and the lower panel support points are located near the lower chords.

50. The canal system of claim 48 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord, and the transverse joint members.

51. The canal system of claim 48 also comprising:

a) a plurality of gutter means, each gutter means being located between adjacent canal spanning members, each gutter means spanning the length of the canal spanning members and being located below and between the lower edges of the adjacent reflectors and the lower edges of the non-reflective roofing panels, said gutter means being connected to an underlying gutter support means; and b) a plurality of weathertight gutter sealing means, each gutter sealing means being disposed between each gutter means and the gutter seams.

52. The canal system of claim 48 wherein weathertight panel sealing means are integrated into the lateral edges, the upper edge, and the lower edge of each reflector.

53. The canal system of claim 48 wherein each collector is oriented lengthwise within 30 degrees of a true East-West polar axis.

54. The canal system of claim 48 wherein the spanning member cap means are dimensioned and configured such that at least one daylighting means is located on a surface of the spanning member cap means.

55. The canal system of claim 48 having at least one daylighting means, wherein each daylighting means comprises:

a) a raised daylighting panel disposed substantially vertically from the surface of the spanning member cap means; and b) a daylighting panel housing attached to the spanning member cap means, said housing being dimensioned and configured so as to form a weathertight seal between the raised daylighting panel and the spanning member cap means.

56. The canal system of claim 48 having at least one daylighting means, wherein said daylighting means comprises a daylighting panel disposed in place of a reflector or a non-reflective roofing panel, said daylighting panel being dimensioned and configured to form a weathertight seal with adjacent panel seams.

57. The canal system of claim 48 wherein the non-reflective roofing panels transmit light.

58. The canal system of claim 48 wherein the non-reflective roofing panels are substantially planar.

59. The canal system of claim 48 wherein the non-reflective roofing panels are disposed in a substantially vertical orientation.

60. The canal system of claim 1 wherein:

a) the structural support means comprises a plurality of canal spanning members, a plurality of first load-bearing members, and a plurality of second load-bearing members, each canal spanning member spanning from a first load-bearing building member to a second load-bearing building, each canal spanning member being separated from an adjacent canal spanning member or an outside wall of the covered structure by a distance at least sufficient to allow two solar energy concentrating reflectors or two backing panels to be disposed arcuately end-to-end within that distance, each canal spanning member having an underlying panel support means, and each canal spanning member being dimensioned and configured to support the weight of all of the supported elements in paragraphs b) to f), as well as conventional dead loads and live loads;

b) the membrane means comprising:

i) a plurality of backing panels, each backing panel having a concave and cylindrically arcuate configuration of up to 90 degrees, a lower edge, an upper edge, and lateral edges, wherein at least one of the lateral edges of each backing panel, disposed in a row of adjacent backing panels, attaches to at least one underlying panel support means, such that the skyward surface of the backing panel is the concave surface, the lower edge of each backing panel being adjacent along the entire lower edge to the lower edge of an arcuately paired backing panel, and each backing panel being dimensioned and configured along the lateral edges wherein the lateral edge of a backing panel can be placed adjacent to the lateral edge of another backing panel extending for up to the length of the underlying canal spanning member so as to form the row of adjacent backing panels;

ii) a plurality of solar energy concentrating reflectors, each reflector having a skyward facing surface that reflects radiant solar energy, each reflector having an upper edge, a lower edge, and lateral edges, and each reflector being disposed on top of the skyward surface of an underlying backing panel;

iii) a plurality of spanning member cap means, each spanning member cap means being attached to an underlying cap support, each spanning member cap means extending lengthwise for the length of the canal spanning member and extending laterally across the canal spanning member, wherein each spanning member cap means is dimensioned and configured so as to form a weathertight seal with the backing panels or the reflectors, and the canal spanning member;

iv) a plurality of end cap means, each end cap means being connected to otherwise exposed structural support means and membrane means, each end cap means being dimensioned and configured so as to form a tight seal with the membrane means elements to which the end cap means is connected;

v) a plurality of weathertight panel sealing means, said panel sealing means being located at panel seams;

c) the collector support means comprises a plurality of collector support means, each collector support means disposed over a row of reflectors, wherein each collector support means comprises collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first canal spanning member and canal spanning member so as to allow a reflected solar energy collector to move within a predetermined focal zone for collecting reflected solar energy form the underlying reflectors, said collector support members being dimensioned and configured so to support said collector;

d) the secondary collector means comprises a plurality of reflected solar energy collectors, each collector extending lengthwise over a row of arcuately paired, adjacent reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

e) the collector positioning means locates each collector in an optimal position within the focal collection zone for each collector throughout a defined solar cycle, said positioning means being connected to each collector support means; and f) the fluid transport means connects each conduit to a thermal energy use means or an energy storage means, where the fluid transport means circulates the solar-energy heated fluid through the plurality of conduits.

61. The canal system of claim 60 wherein each canal spanning member comprises a space truss, each space truss having a plurality of web sections connecting at least one upper chord to at least two lower chords wherein the upper panel support points are located near the upper chord and the lower panel support points are located near the lower chords.

62. The canal system of claim 60 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord, and the transverse joint members.

63. The canal system of claim 60 wherein the reflectors are dimensioned and configured such that each reflector may be detached, removed, and replaced individually.

64. The canal system of claim 60 also comprising:
a) a plurality of gutter means, each gutter means being located between adjacent canal spanning members, each gutter means spanning the length of the canal spanning members and being located below and between the lower edges of the arcuately paired reflectors, said gutter means being connected to an underlying gutter support means; and
b) a plurality of weathertight gutter sealing means, each gutter sealing means being disposed between gutter seams.

65. The canal system of claim 64 wherein the gutter means has an insulating means disposed beneath the gutter means.

66. The canal system of claim 60 wherein the backing panels, the end cap means, and the spanning member cap means having an insulating means disposed beneath.

67. The canal system of claim 60 wherein the backing panels, the end cap means, and the spanning member cap means have an insulting means attached to the surface thereof.

68. The canal system of claim 60 wherein weathertight panel sealing means are integrated into the panel seams.

69. The canal system of claim 60 wherein each collector is oriented lengthwise within 30 degrees of a true North-South axis.

70. The canal system of claim 60 wherein the spanning member cap means are dimensioned and configured such that at least one daylighting means is located on a surface of the spanning member cap means.

71. The canal system of claim 1 wherein:
a) the structural support means comprises a plurality of canal spanning members, a plurality of first load-bearing members, and a plurality of second load-bearing members, each canal spanning member spanning from a first load-bearing building member to a second load-bearing building, each canal spanning member being separated from a adjacent canal spanning member or an outside wall of the covered structure by a distance at least sufficient to allow two solar energy concentrating reflectors to be disposed arcuately end-to-end within that distance, each canal spanning member having an underlying panel support means, and each canal spanning member being dimensioned and configured to support the weight of all of the supported elements in paragraphs b) to f), as well as conventional dead loads and live loads;
b) the membrane means comprises:
i) the primary reflector means comprising a plurality of solar energy concentrating reflectors, each reflector having a concave and cylindrically arcuate of up to 90 degrees, a lower edge, an upper edge, and lateral edges, wherein at least one of the lateral edges of each reflector, disposed in a row of adjacent reflectors, attaches to an underlying panel support means, the reflectors being disposed such that the skyward surface of each reflector is the concave surface, each reflector having a skyward facing surface that reflects radiant solar energy, the lower edge of each reflector being adjacent along the entire lower edge to the lower edge of an arcuately paired reflector, and each reflector being dimensioned and configured along the lateral edges wherein the lateral edge of a reflector can be placed adjacent to the lateral edge of another reflector for the length of the underlying canal spanning member so as to form the row of adjacent reflectors;

ii) a plurality of spanning member cap means, each spanning member cap means being attached to an underlying cap support, each spanning member cap means extending lengthwise for the length of the canal spanning member and extending laterally across the canal spanning member, wherein each spanning member cap means is dimensioned and configured so as to form a weathertight seal with the underlying reflectors and the canal spanning member;

iii) a plurality of end cap means, each end cap means being connected to otherwise exposed structural support means and membrane means elements, each end cap means being dimensioned and configured so as to form a weathertight seal with the membrane means elements to which the end cap means is connected; and iv) a plurality of weathertight panel sealing means, said panel sealing means being located at the panel;

c) the collector support means comprises a plurality of collector support means, each collector support means disposed over a row of reflectors, wherein each collector support means comprise a plurality of collector support members attached to adjacent spanning member cap means or the underlying canal spanning members of the adjacent spanning member cap means, thereby spanning from the top of a first canal spanning member to the top of a second adjacent canal spanning member, at least two collector support members being disposed between said first canal spanning member and second canal spanning member so as to allow a reflected solar energy collector to move within a predetermined focal zone for collecting reflected solar energy from the underlying reflectors, said collector support means being dimensioned and configured so to support said collector;

d) the secondary collector means comprises a plurality of reflected solar energy collectors, each collector extending lengthwise over a row of adjacent and arcuately paired reflectors, each collector being connected to at least two collector support members so as to be disposed to move within the focal collection zone, and each collector being dimensioned and configured to receive the reflected solar energy into a conduit through which an energy transfer fluid can flow, said fluid being heated by the reflected solar energy;

e) the positioning means locates each collector in an optimal position within the focal collection zone for each collector throughout a defined solar cycle, said positioning means being connected to each collector support means; and f) the fluid transport means connects each conduit to a thermal energy use means or an energy storage means, wherein the fluid transport means circulates the solar-energy heated fluid through the plurality of conduits.

72. The canal system of claim 71 wherein each canal spanning member comprises a space truss, each space truss having a plurality of web sections connecting at least one upper chord to at least two lower chords wherein the upper panel support points are located near the upper chord and the lower panel support points are located near the lower chords.

73. The canal system of claim 71 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord, and the transverse joint members.

74. The canal system of claim 71 also comprising:
a) a plurality of gutter means, each gutter means being located between adjacent canal spanning members, each gutter means spanning the length of the canal spanning members and being located below and between the lower edges of the arcuately paired reflectors, said gutter means being connected to an underlying gutter support means; and
b) a plurality of weathertight gutter sealing means, each gutter sealing means being disposed at gutter seams.

75. The canal system of claim 71 wherein weathertight panel sealing means are integrated into the lateral edges, the upper edge, and the lower edge of each reflector.

76. The canal system of claim 71 wherein each collector is oriented lengthwise are within 30 degrees of a true North-South axis.

77. The canal system of claim 71 wherein the spanning member cap means are dimensioned and configured such that at least one daylighting means is located on a surface of the spanning member cap means.

78. The canal system of claim 71 having at least one daylighting means, wherein each daylighting means comprises:
a) a raised daylighting panel disposed substantially vertically from the surface of the spanning member cap means; and
b) a daylighting panel housing attached to the spanning member cap means, said housing being dimensioned and configured to form a weathertight seal between the raised daylighting panel and the spanning member cap means.

79. The canal system of claim 71 having at least one reflector and the underlying backing panel replaced by a daylighting panel, said daylighting panel being dimensioned and configured to form a weathertight seal with adjacent panel seams.

80. A canal system having reduced evaporative loss comprising:
a) a canal for the transport of water having:
i) a bottom surface;
ii) a first side wall attached to the bottom surface and extending upwards; and
iii) a second side wall attached to the bottom surface opposite the first side wall and extending upwards, the first and second side walls being attached to the bottom surface and extending longitudinally so as to form the canal;
b) a first load-bearing member disposed about the first side wall of the canal;

c) a second load-bearing member disposed about the second side wall of the canal;

d) a structural support means that extends above and across the upper surface of the water which is supported by the first and second load-bearing members, said structural support means being dimensioned and configured to support the weight of at least a membrane means and a photo-voltaic collector means that converts solar energy into electrical energy;

e) a membrane means that covers the structural support means so as to form a substantially air tight relationship between the upper surface of the water and the ambient weather about the canal; and f) a photo-voltaic collector means having a lower edge, an upper edge, and lateral edges which is disposed above the structural support means.

81. The canal system of claim 80 wherein:

a) the structural support means further comprises a plurality of canal spanning members, a plurality of first load-bearing members, and a plurality of second load-bearing members, each canal spanning member spanning from a first load-bearing member to a second load-bearing member, each canal spanning member being separated from an adjacent canal spanning member or an outside wall of an elevated cover by a distance at least sufficient to allow a backing panel or a photo-voltaic panel to be disposed within that distance, each canal spanning member having an underlying panel support means, and each canal spanning member being dimensioned and configured to support the weight of all of the supported elements in paragraphs b) and c), as well as conventional dead loads and live loads;

b) the membrane means comprises:

i) a plurality of backing panels, each backing panel having a lower edge, an upper edge, and lateral edges, wherein at least one of the lateral edges of at least one backing panel, disposed in a row of adjacent backing panels, attaches to the underlying panel support means, and each backing panel being dimensioned and configured along the lateral edges wherein the lateral edge of a backing panel can be placed adjacent along the lateral edge of another backing panel extending for up to the length of the underlying canal spanning member so as to form the row of adjacent backing panels;

ii) a plurality of spanning member cap means, each spanning member cap means being connected either to the top of a canal spanning member, the upper edge of a photo-voltaic panel, or the upper edge of a backing panel, each spanning member cap means extending lengthwise for the length of the canal spanning member and extending laterally across the canal spanning member, wherein each spanning member cap means is dimensioned and configured so as to form a weathertight seal with the backing panels and the canal spanning member, iii) a plurality of end cap means, each end cap means being connected to otherwise exposed structural support means and membrane means elements, each end cap means being dimensioned and configured so as to form a tight seal with the membrane means elements to which the end cap means is connected; and iv) a plurality of weathertight panel sealing means, said panel sealing means being located at the panel seams; and c) the photo-voltaic collector means comprises a plurality of photo-voltaic panels, each photo-voltaic panel having a skyward facing surface that absorbs radiant solar energy, an upper edge, a lower edge, and lateral edges, and each photo-voltaic panel being disposed on top of the skyward surface of an underlying backing panel.

82. The canal system of claim 81 wherein each canal spanning member comprises a space truss, said space truss having a plurality of web sections connecting at least one upper chord to at least two lower chords wherein the upper panel support points are located near the upper chord and the lower panel support points are located near the lower chords.

83. The canal system of claim 81 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord, and the transverse joint members.

84. The canal system of claim 81 wherein the photo-voltaic collectors are dimensioned and configured such that each photo-voltaic panel may be detached, removed, and replaced individually.

85. The canal system of claim 81 also comprising:

a) a plurality of gutter means, each gutter means being located between adjacent canal spanning members, each gutter means extending the length of the canal spanning members and being located below the lower edges of the row of adjacent photo-voltaic panels, said gutter means being connected to an underlying gutter support means; and b) a plurality of weathertight gutter sealing means, each gutter sealing means being disposed between each gutter seam.

86. The canal system of claim 85 wherein the gutter means has an insulating means disposed beneath the gutter means.

87. The canal system of claim 85 wherein the backing panels, the end cap means, and the spanning member cap means have an insulating means.

88. The canal system of claim 85 having at least one photo-voltaic panel and the underlying backing panel or at least one non-reflective roofing panel replaced by a daylighting panel, said daylighting panel being dimensioned and configured to form a weathertight seal with adjacent panels seams.

89. The canal system of claim 81 wherein the backing panels, the end cap means, and the spanning member cap means have an insulating means disposed.

90. The canal system of claim 81 wherein weathertight panel sealing means are integrated into the panel seams.

91. The canal system of claim 81 wherein the spanning member cap means are dimensioned and configured such that at least one daylighting means is located on a surface of the spanning member cap means.

92. The canal system of claim 81 having at least one photo-voltaic panel and the underlying backing panel replaced by a non-reflective roofing panel, said non-reflective roofing panel being dimensioned and configured to form a weathertight seal with adjacent panel seams.

93. The canal system of claim 80 wherein a) the structural support means comprises a plurality of canal spanning members, a plurality of first load-bearing members, and a plurality of second load-bearing members, each canal spanning member spanning from a first load-bearing building member to a second load-bearing building, each canal spanning member being separated from an adjacent canal spanning member or an outside wall of the covered structure by a distance at least sufficient to allow at least a photo-voltaic panel to be disposed within that distance, each canal spanning member having a plurality of underlying panel support means, and each canal spanning member being dimensioned and configured to support the weight of all of the supported elements in paragraphs b) to f), as well as conventional dead loads and live loads;

b) the membrane means comprises:
  i) a plurality of spanning member cap means, each spanning member cap means being connected to an underlying cap support means, each spanning member cap means extending lengthwise for the length of the canal spanning member and extending laterally across the canal spanning member, wherein each spanning member cap means is dimensioned and configured so as to form a weathertight seal with the reflectors and the canal spanning member;
  ii) a plurality of end cap means, each end cap means being connected to otherwise exposed structural support means and membrane means, each end cap means being dimensioned and configured so as to form a weathertight seal with the membrane means elements to which the end cap means is connected; and
  iii) a plurality of weathertight panel sealing means, said panel sealing means being located at the panel seams; and
  iv) a plurality of photo-voltaic panels disposed in a row of adjacent panels, each photo-voltaic panel having a skyward facing surface that absorbs radiant solar energy, an upper edge, a lower edge, and lateral edges, and each photo-voltaic panel being attached to the underlying panel support means.

94. The canal system of claim 93 wherein each canal spanning member comprises a space truss, each space truss having a plurality of web sections connecting at least one upper chord to at least two lower chords wherein the upper panel support points are located near the upper chord and the lower panel support points are located near the lower chords.

95. The canal system of claim 93 wherein each canal spanning member comprises a flat truss having a plurality of web members disposed between an upper chord and a lower chord, and also comprising a plurality of transverse joist members being connected to the lower chord, the upper panel support points being located at or near the upper chord and the lower panel support points being located at or near the lower chord and the transverse joint members.

96. The canal system of claim 93 wherein the reflectors are dimensioned and configured such that each reflector may be detached, removed, and replaced individually.

97. The canal system of claim 93 also comprising:
  a) a plurality of gutter means, each gutter means being located between adjacent canal spanning members, each gutter means extending the length of the canal spanning members and being located below the lower edges of the adjacent reflectors, said gutter means being connected to an underlying gutter support means; and
  b) a plurality of weathertight gutter sealing means, each gutter sealing means being disposed between each gutter means and the gutter seams.

98. The canal system of claim 93 wherein weathertight panel sealing means are integrated into the lateral edges, the upper edge, and the lower edge of each reflector.

99. The canal system of claim 93 wherein each collector is oriented lengthwise within 30 degrees of a true East-West axis.

100. The canal system of claim 93 wherein the spanning member cap means are dimensioned and configured such that at least one daylighting means is located on a surface of the spanning member cap means.

101. The canal system of claim 93 having at least one daylighting means, wherein each daylighting means comprises:
  a) a raised daylighting panel disposed substantially vertically from the surface of the spanning member cap means; and
  b) a daylighting panel housing attached to the spanning member cap means, said housing being dimensioned and configured to form a weathertight seal between the raised daylighting panel and the spanning member cap means.

102. The canal system of claim 93 having at least one reflector replaced by a daylighting panel, said daylighting panel being dimensioned and configured to form a weathertight seal with adjacent panel.

103. The canal system of claim 93 having at least one reflector replaced by a non-reflective roofing panel, said non-reflective roofing panel being dimensioned and configured to form a weathertight seal with adjacent panel seams.

104. The canal system of claim 103 having at least one reflector or at least one non-reflective roofing panel replaced by a daylighting panel, said daylighting panel being dimensioned and configured to form a weathertight seal with adjacent panel seams.

\* \* \* \* \*